(12) United States Patent
Agranat

(10) Patent No.: US 7,454,334 B2
(45) Date of Patent: Nov. 18, 2008

(54) METHOD AND APPARATUS FOR AUTOMATICALLY IDENTIFYING ANIMAL SPECIES FROM THEIR VOCALIZATIONS

(75) Inventor: Ian Agranat, Concord, MA (US)

(73) Assignee: Wildlife Acoustics, Inc., Concord, MA (US)

( * ) Notice: Subject to any disclaimer, the term of this patent is extended or adjusted under 35 U.S.C. 154(b) by 841 days.

(21) Appl. No.: 10/903,658

(22) Filed: Jul. 30, 2004

(65) Prior Publication Data

US 2005/0049877 A1 Mar. 3, 2005

Related U.S. Application Data

(63) Continuation-in-part of application No. 10/767,801, filed on Jan. 29, 2004.

(60) Provisional application No. 60/498,507, filed on Aug. 28, 2003.

(51) Int. Cl.
*G10L 15/00* (2006.01)
*G10L 15/06* (2006.01)
*A01K 15/00* (2006.01)

(52) U.S. Cl. ............ 704/231; 704/243; 704/246; 704/270; 119/713; 119/718

(58) Field of Classification Search ............ None
See application file for complete search history.

(56) References Cited

U.S. PATENT DOCUMENTS 5,452,364 A 9/1995 Bonham (Continued)

FOREIGN PATENT DOCUMENTS

CA 2 089 597 A 8/1994

EP 0 629 996 A2 12/1994

OTHER PUBLICATIONS

Clemins, P. Johnson, M. "Application of speech recognition to african elephant vocalizations" Acoutics, Speech and Signal Processing vol. 1, Apr. 2003, pp. 484-487.*

(Continued)

*Primary Examiner*—David R Hudspeth
*Assistant Examiner*—Matthew J. Sked
(74) *Attorney, Agent, or Firm*—Lowrie, Lando & Anastasi, LLP

(57) ABSTRACT

Relatively powerful hand-held computing devices, Digital Signal Processors, Audio signal processing technology, voice recognition technology, expert systems, Hidden Markov Models, and/or neural networks are employed in a device capable of real-time automated species identification by listening to bird vocalizations in the field, analyzing their waveforms, and comparing these waveforms against known reference samples. An apparatus for identifying animal species from their vocalizations, comprises a source of digital signal representative of at least one animal candidate vocalization; a feature extractor that receives the digital signal, recognizes notes therein and extracts phrases including plural notes and that produces a parametric representation of the extracted phrases; and a comparison engine that receives the parametric representation of at least one of the digital signal and the extracted phrases, and produces an output signal representing information about the animal candidate based on a likely match between the animal candidate vocalization and known animal vocalizations. A computer-implemented method of identifying animal species, comprises: obtaining a digital signal representing a vocalization by a candidate animal; transforming the digital signal into a parametric representation thereof; extracting from the parametric representation a sequence of notes defining a phrase; comparing the phrase to phrases known to be produced by a plurality of possible animal species; and identifying a most likely match for the vocalization by the candidate animal based upon the comparison. The comparison engine or comparison function may use Hidden Markov Models, expert systems and/or neural networks.

93 Claims, 10 Drawing Sheets

U.S. PATENT DOCUMENTS

| | | | |
|---|---|---|---|
| 5,956,463 | A | 9/1999 | Patrick et al. |
| 6,546,368 | B1* | 4/2003 | Weninger et al. .......... 704/270 |
| 7,082,394 | B2* | 7/2006 | Burges et al. .............. 704/243 |
| 2001/0044719 | A1 | 11/2001 | Casey |
| 2003/0125946 | A1* | 7/2003 | Hsu ........................ 704/246 |
| 2004/0107104 | A1 | 6/2004 | Schaphorst |

OTHER PUBLICATIONS

Franzen, A. Gu, I. "Classification of bird species by using key song searching: a comparative study" Systems, Man and Cybernetics, vol. 1, Oct. 2003, pp. 880-887.*

Anderson, S. Dave, A. Margoliash, D. "Template-based automatic recognition of birdsong syllables from continuous recordings." J. Acoust. Soc. Am. 100, pt. 1, Aug. 1996.*

Kogan, J. Maroliash, D. "Automated recognition of bird song elements from continuous recordings using dynamic time warping and HHM: A comparative study" J. Acoustic Soc. Am. 103, Apr. 1998.*

Harma, A. "Automatic identification of bird species based on sinusoidal modelling of syllables." IEEE International Conference on Acoustics, Speech and Signal Processing, vol. 5, pp. 545-548, Apr. 2003.*

Anderson, S.E., et al., Department of Organismal Biology and Anatomy, University of Chicago, Speech Recognition Meets Bird Song: A Comparison of Statistics-Based and Template-Based Techniques, JASA, vol. 106, No. 4, Pt. 2, Oct. 1999.

Anonymous, The Basics of Microphones, Apr. 26, 2003, pp. 1-4, http://www.nrgresearch.com/microphonestutorial.htm.

Lleida, L. et al., Robust Continuous Speech Recognition System Based on a Microphone Array, IEEE International Conference on Seattle, WA, pp. 241-244, May 12, 1998.

Suksmono, A.B., et al., Adaptive Image Coding Based on Vector Quantization Using SOFM-NN Algorithm, IEEE APCCAS (Asia-Pacific Conference on Chiangmai, Thailand, pp. 443-446, Nov. 1998.

El Gayar, N. et al., Fuzzy Neural Network Models for High-Dimensional Data Clustering, ISFL '97, Second International ICSC Sumposium on Fuzzy Logical and Applications ICSC Academic Press, Zurich, Switzerland, pp. 203-209, Feb. 12, 1997.

Mcilraith, Alex L. and Card, Howard C., Birdsong Recognition Using Backpropagation and Multivariate Statistics, IEEE Transactions on Signal Processing, vol. 45, No. 11, Nov. 1997.

http://ourworld.compuserve.com/homepages/G_Kunkel/project/Project.htm Jun. 22, 2004.

Harma, Aki, "Automatic Identification of Bird Species Based pm Sinusoidal Modeling of Syllables", IEEE Int. Conf. Acoustics, Speech, Signal Processing (ICASSP 2003), Hong Kong, Apr. 2003.

Anderson, S.E., et al., Department of Organismal Biology and Anatomy, University of Chicago, Automatic Recognition and Analysis of Birdsong Syllables from Continuous Recordings, Mar. 8, 1995.

Kogan, Joseph A. and Margoliash, Automated Recognition of bird song elements from continuous recordings using dynamic time warping and hidden Markov models: A Comparative Study, J. Acoust. Soc. Am. (4), Apr. 1998.

* cited by examiner

METHOD AND APPARATUS FOR AUTOMATICALLY IDENTIFYING ANIMAL SPECIES FROM THEIR VOCALIZATIONS

CROSS-REFERENCE TO RELATED APPLICATIONS

As to at least some claimed subject matter, this application claims domestic priority under 35 U.S.C. §119(e) to Provisional U.S. Patent Application Ser. No. 60/498,507, filed Aug. 28, 2003, pending, incorporated herein by reference.

As to at least some claimed subject matter, this application claims the benefit under 35 U.S.C. §120 of U.S. patent application Ser. No. 10/767,801, filed Jan. 29, 2004, pending, incorporated herein by reference.

BACKGROUND

Naturalists and others often identify animal species in the field, initially, on the basis of their observable vocalizations.

Experienced bird watchers and naturalists have identified specific species of birds by their unique song vocalizations for centuries. Several hundred such songs have been documented in North America alone, and several books, tapes, and CDs have been published on the topic.

Amateur bird watchers, naturalists, students, and other interested parties may wish to identify birds by their songs in the field, but may not have the training, skill and experience necessary to do so effectively.

In addition, bird watchers may wish to know if particular species of birds have been present in an area without monitoring that area themselves for extended periods of time.

Several attempts to recognize bird species from their vocalizations have been reported in the literature. Several of those prior attempts are now described.

One method of classifying birds on the basis of their vocalizations is described by Anderson et al., *Automatic Recognition and Analysis of Birdsong Syllables from Continuous Recordings*, Mar. 8, 1995, Department of Organismal Biology and Anatomy, University of Chicago. Anderson et al. teach a method including digitizing the signal into 15-bit samples at 20,000 samples per second, performing a series of 256-point Fast Fourier Transforms (FFTs) to convert to the frequency domain, detecting notes and silence intervals between notes, and comparing the FFT series corresponding to each note with templates of known notes classes using a Dynamic Time Warping technique.

The approach of Anderson et al. has several shortcomings. The templates are insufficiently flexible to account for the substantial variability of vocalizations among individuals of some species. The approach produces an unacceptable rate of false positives among species with overlapping note classes. Furthermore, template matching is highly susceptible to noise. Finally, the approach of Anderson et al. emphasizes the wrong parts of the frequency spectrum because the bioacoustic perception of frequency is not linear as this method assumes.

Another published method is described by Kunkel, G., *The Birdsong Project,* 1996-2004, Western Catskills of New York State, http://ourworld.compuserve.com/homepages/G_Kunkel/project/Project.htm. Kunkel teaches a method for monitoring and classifying birds from their vocalizations including receiving a signal from a microphone for ten seconds, digitizing the signal into 8-bit samples at 14,925 samples per second, performing a series of 256-point FFTs to convert to the frequency domain, detecting notes and silence intervals between notes, and extracting parameters for each note including the frequency of the note at it's highest amplitude, the frequency modulation of the note as a series of up to three discrete upward or downward rates of change representing up to two inflection points, the duration of the note, and the duration of the silence period following the note. The parameters corresponding to notes of known bird songs are compiled into a matrix filter, and the matrix filter is applied to recordings of unknown bird songs to determine if the known bird song may be present in the sample.

The approach described by Kunkel has several different shortcomings. For example, birdsongs from many different species often contain individual notes that would be classified as the same, making those species difficult or impossible to distinguish. Like Anderson et al., the approach taken by Kunkel fails to take into consideration the context of notes, resulting in false positives among species with overlapping note classes. Also, since some birds have broadband vocalizations consistent determination of frequency modulation parameters may be difficult. Indeed, even a noisy background would make the consistent determination of frequency modulation parameters difficult. Finally, like Anderson et al., in Kunkel frequency is measured on a linear scale which fails to properly account for the bioacoustic perception of frequency.

In McIlraith et al., *Birdsong Recognition Using Backpropogation and Multivariate Statistics*, IEEE Transactions on Signal Processing Vol. 45 No. 11, November 1997, two different methods for classifying birds from their vocalizations are taught.

In the first method, birdsong is digitized into 8-bit samples at 11,025 samples per second, automatic gain control is used to normalize signal levels to peak amplitude, a series of 512-point FFTs is performed to convert to the frequency domain, 16 time-domain coefficients are generated for a $15^{th}$ order LPC filter for each frame, and a 16-point FFT performed on the filter coefficients to produce 9 unique spectral magnitudes, and the 9 spectral magnitudes combined with a song length to produce a series of 10 parameters per frame used in a back-propagating neural network, tallying per-frame classifications over the length of the song.

In the second method, birdsong is digitized into 8-bit samples at 11,025 samples per second, a leaky integrator function is used to parse the song into notes counting the number of notes and determining the mean and standard deviation of both the duration of notes and duration of silent periods between the notes, and using a series of 16-point FFTs to determine the mean and standard deviation of normalized power occurring in each of 9 frequency bands resulting in a total of 23 possible parameters. Only 8 of these parameters were found to be statistically significant and were used in classification tests with either a back-propagating neural network or with other statistical methods.

These methods aggregate spectral information on a frame-by-frame basis, without regard for any finer structure to the birdsong. Because many bird species have overlapping spectral properties, these methods can not achieve high recognition rates across a large number of individual species. Furthermore, in both of these methods, both power and frequency is measured on a linear scale, disregarding that the bioacoustic perception of sound is not linear in either power or frequency.

In Kogan et al., *Automated recognition of bird song elements from continuous recordings using dynamic time warping and hidden Markov models: A comparative study*, Aug. 4, 1997, Department of Organismal Biology and Anatomy, University of Chicago, yet another method of classifying birds from their vocalizations is taught. This method includes digitizing the bird song, extracting a time series of Mel Frequency Cepstral Coefficients (MFCC), and computing the probabilities that HMMs representing a known birdsong produced the observation sequence represented by the sequence of coefficients. The HMMs have a fixed number of states for each note with a simple bi-grammar structure to recognize occurrences of note pairs.

Under this method, individual notes need to be manually classified before training the HMMs. This is a difficult, labor-intensive and time-consuming process. Furthermore, HMMs of a fixed number of states do not discriminate well among notes of variable durations. The simple bi-grammar of Korgan et al. correlates too coarsely to the structure of birdsongs to be able to distinguish among a large number of diverse species. Also, Korgan et al. teach using a diagonal co-variance matrix that does not provide adequate discrimination across models with respect to the relative weighting of spectral and temporal properties. Finally, the Mel-scale used by Korgan et al. is ill-suited to the analysis of birdsongs with higher-frequency vocalizations.

Härmä, Aki, "Automatic Identification of Bird Species based on Sinusoidal Modeling of Syllables", 2003, Laboratory of Acoustics and Audio Signal Processing, Helsinki University of Technology. Aki teaches a method of classifying birds from their vocalizations comprising the steps of digitizing the vocalization at a rate of 44,100 samples per second, performing a series of 256-point FFTs to convert to the frequency domain over the duration of the sample to create a spectrogram, extracting individual sinusoids from the spectrogram, determining the frequency and log power trajectory of each sinusoid through time, and using these parameters to compare against those of known birdsong.

One disadvantage of the Aki approach is that it may be difficult to extract individual sinusoids from a broadband vocalization. Another disadvantage of the Aki approach is that it may not consistently extract sinusoids in vocalizations with harmonic components. Yet another disadvantage of the Aki approach is that it does not consider how sinusoids might be combined into notes or how notes might be combined into phrases. Yet another disadvantage of the Aki approach is that frequency is represented on a linear scale whereas the bioacoustic perception of animal vocalizations is on a logarithmic scale.

SUMMARY OF THE INVENTION

In general, animal identification in the field, particularly bird watching, has not benefited much from advancement in technology. According to various aspects of embodiments of the present invention, relatively powerful hand-held computing devices, Digital Signal Processors, Audio signal processing technology, voice recognition technology, expert systems, Hidden Markov Models, and/or neural networks may be applied in the present invention to create a device capable of real-time automated species identification by listening to animal vocalizations in the field, particularly bird vocalizations, analyzing their waveforms, and comparing these waveforms against known reference samples.

Embodiments of the present invention according to one aspect make use of Hidden Markov Models that can be trained to represent a more generalized representation of vocalizations than is possible using templates. Additionally, Hidden Markov Models are resilient and resistant to insertion and deletion errors that can occur in a noisy environment. The variable structure of Hidden Markov Models, as used in accordance with this aspect, represents vocalizations at the phrase level taking into account the context of how notes are combined into phrases. The effect of noise is further reduced in some embodiments of the present invention by filtering the input signal before analysis. The effect of noise is further reduced in some embodiments of the invention by normalizing the dynamic range represented in the signal. The effect of noise is still further reduced in some embodiments of the invention by making use of a small number of DCT coefficients to represent the spectral energy of a frame. And finally, some embodiments of the present invention make use of a logarithmic frequency scale to more accurately model the bioacoustic perception of animal vocalizations, rather than linear scales or the Mel scale mentioned above.

Embodiments of the present invention according to another aspect analyze vocalizations at the phrase level taking into consideration the context of how notes are combined into phrases. Some embodiments of the present invention make use of DCT coefficients for spectral parameters as well as HMM state transition probabilities for temporal parameters which can be applied consistently to both narrowband and broadband vocalizations and are resilient to noise.

Embodiments of the present invention according to yet another aspect take into account how frames are combined to form notes, and how notes are combined to form phrases, so as to provide a more accurate model capable of discriminating complex vocalizations from among a wide range of species. Embodiments of the present invention according to some aspects also make use of a logarithmic scale for both the frequency and/or power measurements so as to more accurately model the bioacoustic perception of animal. vocalizations.

According to further aspects of embodiments of the present invention HMMs can be automatically trained by parameterizing notes in the training data using a set of time-normalized 2-dimensional DCT coefficients and classifying these notes by using a K-Means clustering algorithm. A variable HMM structure can be used to represent how notes are organized into phrases rather than forcing the complex structure of bird songs into the constraints of a simple bi-grammar. A fixed co-variance matrix optimized to provide maximum discrimination by adjusting the relative weighting of spectral and temporal properties can be used.

Embodiments of aspects of the present invention use a series of DCT coefficients to represent spectral energy which can be consistently applied across vocalizations regardless of narrowband, broadband, and harmonic components.

According to some aspects of embodiments of the invention, an apparatus for identifying animal species from their vocalizations, comprises a source of digital signal representative of at least one animal candidate vocalization; a feature extractor that receives the digital signal, recognizes notes therein and extracts phrases including plural notes and that produces a parametric representation of the extracted phrases; and a comparison engine that receives the parametric representation of at least one of the digital signal and the extracted phrases, and produces an output signal representing information about the animal candidate based on a likely match between the animal candidate vocalization and known animal vocalizations. In a variation, the feature extractor comprises a transformer connected to receive the digital signal and which produces a digital spectrogram representing power and frequency of the digital signal at each point in time. In yet a further variation, the transformer comprises a Discrete Fourier Transformer (DFT) having as an output signal a time series of frames comprising the digital spectrogram, each frame representing power and frequency data at a point in time. The power may be represented by a signal having a logarithmic scale. The frequency may be represented by a signal having a logarithmic scale. The power may be represented by a signal that has been normalized relative to a reference power scale. The frequency may be represented by a signal that has been normalized relative to a reference frequency scale. In another embodiment, the feature extractor further comprises a discrete cosine transform (DCT) transformer receiving the digital signal and producing a signal representing plural coefficients defining the parametric representation of the extracted phrases. In yet another embodiment, the feature extractor further comprises a transformer connected to receive the digital signal and which produces a signal defining a parametric representation of each note. The transformer may be a discrete cosine transform (DCT) transformer. The feature extractor may further comprise a time normalizer operative upon each note recognized in the digital signal before the transformer receives the digital signal. The comparison engine may further comprise a cluster recognizer that groups notes into clusters according to similar parametric representations. In such embodiments, the cluster recognizer may perform K-Means. The cluster recognizer may be a self-organizing map (SOM). The cluster recognizer may perform Linde-Buzo-Gray. In yet a further embodiment, the comparison engine further comprises a neural network trained to recognize likely matches between the animal candidate vocalization and the known animal vocalizations. The neural network may further comprise plural layers of processing elements arranged between an input of the comparison engine and an output of the comparison engine, including a Kohonen self-organizing map (SOM) layer. The neural network may further comprise plural layers of processing elements arranged between an input of the comparison engine and an output of the comparison engine, including a Grossberg layer. In yet further embodiments, the comparison engine further comprises a set of hidden Markov models (HMMs) excited by the parametric representation received, each HMM defined by a plurality of states. In such embodiments, at least one of the plurality of states comprises a data structure holding values defining a probability density function defining the likelihood of producing an observation. The probability density function may be a multi-variate Gaussian mixture. The multi-variate Gaussian mixture may be defined by a fixed co-variance matrix. An HMM of the set of HMMs may produce an observation corresponding to a bird species. An HMM corresponding to a set of training data representing at least one vocalization may comprise a first set of states representing a first cluster of time-normalized notes, classified according to similar parametric representations; and a second set of states representing a second cluster of time-normalized notes, classified according to similar parametric representations different from those of the first cluster of time-normalized notes. The HMM may further comprise a state corresponding to a gap between a note of the first cluster and a note of the second cluster. The set of training data may include coefficients from a discrete cosine transform (DCT) performed on a vocalization signal. The first cluster may comprise classification vectors clustered together using a K-Means process, a self-organizing map (SOM), or Linde-Buzo-Gray. The apparatus may further comprise a database of known bird songs. The database may include a data structure holding values in a memory of weights for a neural network. The database may also include a data structure holding values in a memory of parameters for a hidden Markov model (HMM). According to some aspects, the database may include a data structure holding records in a memory corresponding to the known bird songs specific to at least one of a region, a habitat, and a season. The database of known bird songs may be stored in a replaceable memory, such that the database of known bird songs can be modified by replacing the replaceable memory with a replaceable memory holding the modified database. The database of known bird songs may be stored in a modifiable memory. In such an embodiment, the apparatus may include a port, for example a wireless port, through which modifications to the database of known bird songs can be uploaded. The apparatus may further comprise a digital filter interposed between the source of a digital signal and the signal analyzer and classifier. The source may be a microphone. The source may further comprise an analog-to-digital converter connected to receive an analog signal from the microphone an to produce the digital signal. Where the source is a microphone, it may be a shotgun microphone, a parabolic microphone, an omni directional microphone, or an array of microphones. The array of microphones may be made directional by use of beam-forming techniques. The source may further comprise an analog signal input; and an analog-to-digital converter connected to receive a signal from the analog input, and producing the digital input signal. The performance of the apparatus may be such that a time from the signal transformer receiving the digital signal to the comparison engine producing the output signal is real-time.

According to yet another aspect of an embodiment of the invention, a computer-implemented method of identifying animal species, comprises: obtaining a digital signal representing a vocalization by a candidate animal; transforming the digital signal into a parametric representation thereof; extracting from the parametric representation a sequence of notes defining a phrase; comparing the phrase to phrases known to be produced by a plurality of possible animal species; and identifying a most likely match for the vocalization by the candidate animal based upon the comparison. Comparing may further comprise: applying a portion of the parametric representation defining the phrase to plural Hidden Markov Models defining phrases known to be produced by a plurality of possible animal species; and computing a probability that one of the plurality of possible animal species produced the vocalization by the candidate animal.

BRIEF DESCRIPTION OF THE FIGURES

In the Figures, in which like reference designations indicate like elements.

DETAILED DESCRIPTION

Figure 1:
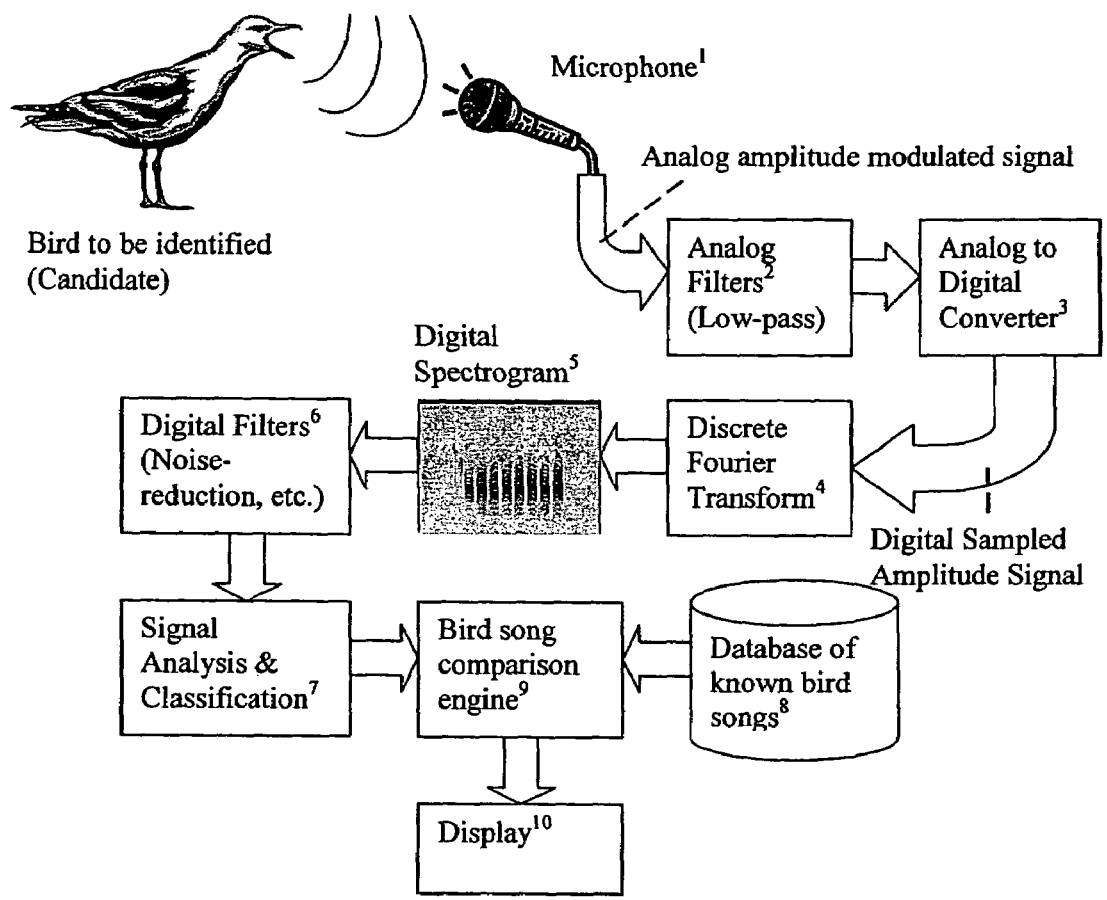
FIG. 1 is a block diagram of an embodiment of aspects of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "compromising," or "having," "containing," "involving", and variations thereof herein, is meant to encompass the items listed thereafter and equivalents thereof as well as additional items.

Embodiments of aspects of the invention include methods and apparatus which obtain a suitable signal for analysis; optionally clean up or preprocess the signal, for example by use of noise reduction processes; extract interesting features of the signal for further analysis; and, compare the extracted features to a database or the like of features corresponding to various known animal species. Using the structure and methods of the exemplary embodiment, real-time performance in the field can be achieved. That is, a species can be identified by the device in the field, while the observer using the device is still observing the animal that is vocalizing, in the field.

The methods and apparatus described herein are suitable for identifying many different species, including but not limited to birds, mammals, insects, etc. Examples are given without limitation, with respect to birds. For this reason, a term such as "note" or "phrase" should be read to include analogs pertaining to other animal families, such as "tone", "phoneme," etc.

Embodiments of aspects of the present invention are described with reference to FIG. 1. Particular embodiments can be implemented in a portable hand-held device carried by the bird watcher. An exemplary device is equipped with a microphone (1) that responds to sounds in the environment. The microphone produces an analog amplitude-modulated signal which may then pass through various analog filters (2), for example, a high-pass filter to avoid picking up low frequency background noise. The analog signal is then digitized with an Analog-to-Digital (A/D) converter (3) to produce a digital signal representing samples of the original analog signal.

A Discrete Fourier Transform (DFT) (4) is performed on the digital signal using a Fast Fourier Transform (FFT) algorithm to convert the amplitude-modulated signal into the frequency domain to produce a digital spectrogram (5). The spectrogram is represented by a digital signal defining a 3-dimensional graph of time, frequency, and amplitude. Additional digital filters (6) may be applied to the spectrogram signal to further reduce background noise and enhance the signal strength of candidate bird vocalizations. The spectrogram signal is then analyzed (7) so as to extract information about suspected bird vocalizations that are necessary for identification. A comparison engine (9) attempts to match the candidate bird vocalization against a database (8) of known bird songs in order to make a positive identification. The result of the comparison is then sent to the display (10) indicating the likely species of bird, or birds, observed and the probability of a positive match, and possibly additional information about the bird such as a picture, migration patterns, typical song, habitat, etc.

The particular partitions of the functions of an embodiment shown in FIG. 1 may be varied without departing from the spirit of the invention. For example, the database of known bird songs (8) could be separate from the comparison engine (9), or could be embedded in the structure of the comparison engine and its logic. If integral with the comparison engine, the database could be embedded in a set of rules in an expert-system implementation of the comparison engine, or could be embodied in the weights to which neurons of a neural network have been programmed, or could be embodied in the parameters of Hidden Markov Models. In another partitioning variation, there may be separate structures for signal analysis and classification (7) and for the comparison engine (8), or they may be combined, or they may be intermingled in such a way as to cause some analysis to be performed before comparison and the balance to be performed after, or other suitable partitioning variations can be used. Furthermore, as explained below, several variations on the analyzer and comparison engine are contemplated, including, but not limited to, HMMs, neural networks and rules engines.

Microphone.

In one illustrative embodiment, the microphone is a modular unit that can be adapted for different situations. For example, a parabolic or shotgun directional microphone, or an array of more than one microphone using beam-forming techniques may be used if it is desirable, in the field, to focus on a specific candidate bird. Omnidirectional microphones may be desirable to capture a wide range of sounds in a particular area, such as when candidate birds are dispersed over a wide area. Different microphones may be better suited for harsh environmental conditions. Analog or digital auxiliary inputs can also be provided for analyzing previously recorded bird songs.

Analog Filters.

In the illustrative embodiment, low-pass and high-pass filters may be employed to help reduce noise. Most bird vocalizations can be observed in approximately a 1,200 Hz-8,000 Hz range. Use of low-pass and high-pass filters at the analog input stage can improve the quality of the signal being analyzed by removing portions unlikely to be part of a bird vocalization.

Analog to Digital Converter.

In the illustrative embodiment, the A/D converter may be integrated with a Digital Signal Processor (DSP) to combine low cost and powerful signal analysis capabilities. Because a Discrete Fourier Transform will be employed, and resolution in time and frequency is important in generating meaningful spectrograms, the sampling rate should be on the order of 16,000 samples per second. While lower sampling rates could produce meaningful spectrograms for some vocalizations, the smaller amount of information will reduce accuracy. There may be alternative digital sound sources that could be received for example by the digital auxiliary input or by some other input point, bypass the A/D converter and be received directly by the DFT engine. Alternative sound sources may be received through digital interfaces to other devices (e.g. the digital auxiliary input may be a USB port connected to a personal computer), or the alternative sound source may be one or more files stored on removable or fixed media (e.g. MP3 or WAV files on a removable FLASH card).

Discrete Fourier Transform.

In the illustrative embodiment, the DFT would be accomplished efficiently using a Fast Fourier Transform (FFT) algorithm on a Digital Signal Processor. However, the FFT algorithm can also be implemented in software on a general purpose microprocessor. With a sample rate of 16,000 per second at the A/D converter, a spectrogram with resolution of 0.016 seconds and 62.5 Hz is possible if each 256 samples are run through the FFT algorithm. Shaped windows can be used to reduce sampling and windowing effects further. For example, Discrete Fourier Transformer leakage can be reduced using overlapping Hanning windows. The resolution discussed herein is sufficient for bird song analysis. Higher sampling rates improve the resolution attainable, the maximum observable frequency, and may improve recognition accuracy.

There are several alternatives to the DFT for extracting frequency data from the input signal. One alternative to the DFT is to use a series of parallel band-pass filters, one for each set of frequencies of interest. Band-pass filters can be implemented using Finite Impulse Response (FIR), Infinite Impulse Response (IIR), or other suitable filtering techniques. Another alternative to the DFT is to use wavelets, such as a Continuous Wavelet Transform (CWT) or Discrete Wavelet Transform (DWT) using Daubechies or other wavelet functions.

Spectrogram.

The spectrogram is the output of a series of FFT operations on the input signal over time, with each operation producing a vector indicating power levels at various frequencies in the audio spectrum at a point in time. In one possible implementation, a number of vectors representing a period of time could be buffered in memory for further processing. In another possible implementation, processing could be performed in real time.

Digital Filters.

Common sources of noise can be identified and eliminated from the signal electronically using any suitable techniques, including those commonly applied to voice and telephony applications. Noise reduction can be achieved by measuring the background noise power levels in each discrete frequency bin produced by the FFT algorithm, and subtracting the background levels from the signal. This technique is commonly referred to as Spectral Subtraction. Echo cancellation techniques can also be applied to eliminate noise caused by the echo of vocalizations off objects such as trees, boulders, and man-made structures.

Many sources of noise in the open field can be described as "pink noise", meaning that the power levels of noise are inversely proportional to frequency. By applying a pink noise filter to the input, lower frequencies can be attenuated more than higher frequencies.

Also, other noise profiles are possible that can be predetermined, or can be determined by field measurements, or can be determined by any other suitable method. When a noise profile can be determined, a suitable filter can then be selected or designed and applied to the input, attenuating frequencies at which the noise occurs more than frequencies at which the signal occurs.

Signal Analysis and Classification

Comparison Engine

The Signal Analysis and Classification function in the current invention analyzes the captured spectrogram and looks for individual waveforms suspected of being candidate vocalizations. This is easily done by looking for strong signals grouped tightly together. Then, these signals may optionally be compared with each other to look for repeating occurrences of individual phrases or notes. The phrases or notes and their characteristics are the extracted features of interest. The number of repetitions of each phrase or note, and the relationship from one phrase or note to the next, the specific waveform, and general characteristics like duration, frequency range, and spacing to other phrases or notes, is collected. A presently preferred embodiment employs phrases as the extracted feature.

The Bird Song Comparison Engine then applies the extracted features to an HMM, to a neural network or to rules stored in the database of known bird songs so as to make a determination of identification. As previously noted, the Signal Analysis and Classification block may be combined with the Comparison Engine.

One possible implementation of a comparison engine is a simple rules-based expert system that applies the rules from each bird to the sample, where the most easily identified references are checked first for quick matches, and more difficult identifications are applied last. Another possible implementation of a comparison engine is a neural network in which the collected characteristics are inputs to the neural network, and the rules are essentially embedded in the weights of the network that produce probabilities of a match for each known reference. Yet another possible implementation of a comparison engine is a collection of Hidden Markov Models in which the collected characteristics represent observation sequences, and the rules are essentially embedded in the parameters of each model that produce probabilities of a match for each known reference. This last approach, which is presently preferred, is described in greater detail in the discussion below of a prototype example. In that discussion, the observation sequences mentioned above are "phrases," which are defined in terms of "notes," which are themselves defined in terms of the signal present over time. As a practical matter, as described below, the signal is divided into frames. Each frame may be considered to be an "observation," and each plurality of frames making up a phrase may be considered to be an "observation sequence," whose parameters are also referred to as "features."

These functional blocks may be implemented in software running on a DSP or a general purpose microprocessor. Depending on the signal being analyzed, this block may perform different functions. For some birds, waveform correlation is more effective, while for others, waveform characterization is more effective.

If the bird to be matched produces a sufficiently clear and distinct waveform, then waveform correlation using any suitable correlation algorithm or a neural network can be used. If a high enough correlation is produced with a waveform in the database, then the species can be deemed identified.

If no definite match can be produced for a waveform, then a rules-based analysis of waveform characteristics could identify birds having more complex vocalizations. Such analysis could examine such properties as frequency, shape, duration, repetition, spacing, attack and decay rates, etc. A more detailed discussion is presented below.

The Signal Analysis, Classification and Comparison blocks may be implemented in software running on a DSP or a general purpose microprocessor.

Feature Extraction

The engine first extracts features from the candidate vocalization that can then be used for comparison against the database of known bird vocalizations. The goal of feature extraction is to reduce the raw data representing the candidate vocalization into a meaningful set of parameters sufficient to differentiate between one species and another. There is a balance between being too specific and not specific enough. If too specific, the candidate vocalization may not be close enough to the correct vocalization as found in the database which may occur as many bird songs vary from individual to individual as well as regionally. If not specific enough, the candidate vocalization may be too close to one or more incorrect vocalizations in the database resulting in an incorrect match. The power spectrum data can be reduced effectively by converting from an absolute power scale to a logarithmic decibel scale. The frequency data can be reduced effectively by converting from a linear frequency scale to a logarithmic frequency scale. Finally, a discrete cosine transformation, for example according to the well-known DCT-II algorithm, of frequency and/or power data can further reduce the data to a compact and meaningful set of features suitable for comparison. Other suitable methods for extracting spectral features, such as Linear Predictive Coding (LPC), real and complex cepstrum coefficients, and others could be used as well.

Feature Comparison

The engine scans the database for each known bird, and applies rules specific to each bird in an attempt to match the known bird with the candidate. The rules can take the form of parameters in a collection of Hidden Markov Models, a rules-based expert system, or weights and parameters in a neural network. The probability of positive identification is calculated, and the most probable match or matches are identified in an output signal. The output signal may represent an aggregation of probable matches over a short period of time. The output signal may be any suitable type of representation of the result. For example, the output signal may be a text string encoded in a digital electrical signal, or may be a digital electrical signal representing an image of the most likely match, or may be any other suitable signal. If the signal causes display of the result, for example on the display mentioned above, whether to display only one or to display more than one probable match is a design choice.

If implemented using a collection of Hidden Markov Models (HMMs), where each model represents a particular vocalization, correlation analysis can be performed by determining which HMM had the highest probability of generating the observed vocalization. In a Comparison Engine based on an expert system using rules, the rules for various different birds can be expressed by a set of concurrent state machines.

If implemented using deterministic computational methods, any such suitable method may be used to find close waveform correlations in the Database of Known Bird Songs. If implemented using a neural network, correlation analysis can be performed by a counter-propagation network with a Kohonen classification layer and a Grossberg output layer. The result produced by such a network is a single, best match, together with the likelihood that the match is correct.

Database of Known Bird Songs

A database of known bird vocalizations is stored in the device. In some embodiments, this database can be upgraded to include new known bird songs, or customized for specific regions (e.g. "Eastern North America"). In one possible implementation, the database could be stored on a removable FLASH memory card. In yet another embodiment, the database could be stored in non-removable FLASH memory, and upgraded by connecting the device to a personal computer using a bus such as USB, or a local area network such as Ethernet or WiFi. In yet another embodiment, the database could be stored in non-removable FLASH memory, and upgraded by connecting to a telecommunications network using a local area network connection, or a dial-up modem connection. The database maps bird vocalizations to the names of specific species, but could also provide additional information to the bird watcher such as a picture of the bird and information about the bird's habitat, migration patterns, and other such information commonly found in birding books, as well as known recordings of the bird's actual vocalizations to help the birdwatcher confirm the results.

The database can take any convenient form, such as time sequences of DFT coefficients, time sequences of DCT coefficients, LPC coefficients, cepstrum coefficients, images of spectrograms, input waveforms, or the like.

The database contains the HMM model parameters for each HMM, as well as information about the species associated with the HMM. There may be several HMMs which in combination describe different vocalizations and their variations for a single species. HMM model parameters include a value for the number of states (to produce variable-length models), mean vectors for the Gaussian mixtures in each state, mixture probability coefficients, initial state probabilities, and a state transition probability matrix. As discussed elsewhere herein, there is no need to store covariance information since a fixed value is used for the covariance matrix.

A typical model contains an average of 14 states that can be represented in 112 mean vector elements (4 DCT coefficients times 2 mixtures times 14 states), 28 mixture probability coefficients (14 states times 2 mixtures per state), 14 initial state probabilities, and 196 (14 states squared) state transition probabilities, or 350 scalar values. With 16-bit fixed-point arithmetic, a typical model can fit in only 700 bytes. Greater compression is possible using well-known data compression algorithms.

In contrast, the raw digitized audio data representing a 6 second long phrase is typically 192,000 bytes (16,000 16-bit samples per second times 6 seconds). Furthermore, the original training data may represent a large number of phrases which are compressed into a single model.

The database can be upgraded with improved parameters, algorithms, or with different sets of birds for different geographies, seasons, and/or habitats, as well as different versions corresponding to different subscription or service levels, such as versions with or without supplemental image information, etc. Upgrades can be provided through a communication port, memory card or other I/O mechanism.

The database can be partitioned such that only birds from a given geography, season, and/or habitat as specified by user input (e.g. from a knob or other input device) would be selected.

The database may require a digital key to unlock its contents for use.

Display/Speaker

The display could be any suitable display, for example a simple liquid crystal text display capable of indicating the name of identified birds and the probability of a strong match. More elaborate displays capable of graphics could also show the candidate and reference spectrograms, pictures of the reference bird, and additional information about the bird's habitat, migration patterns, etc.

It may be desirable for the device to record and play back a bird's vocalization through a speaker. It may also be desirable for the device to play back recordings of known vocalizations stored in the database.

Hardware considerations

Various embodiments of aspects of the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor and especially hand-held computers based on the Motorola Dragonball series of processors or the ARM processors. The computer systems may be based on, or may include, a digital signal processor (DSP), such as Texas Instruments C55xx series or a Texas Instruments C54 or C55 series DSP, or a DSP available from another manufacturer. It should be appreciated that one or more of any type computer system may be used to implement any part of the system according to various embodiments of aspects of the invention. Further, the system may be located on a single computer or may be distributed among a plurality of computers attached by a communications network.

A general-purpose computer system according to one embodiment of the invention is configured to perform each of the described functions, including but not limited to the FFT, DCT, neural network and/or correlation function. It should be appreciated that the system may perform other functions, including network communication, and the invention is not limited to having any particular function or set of functions.

Figure 7:
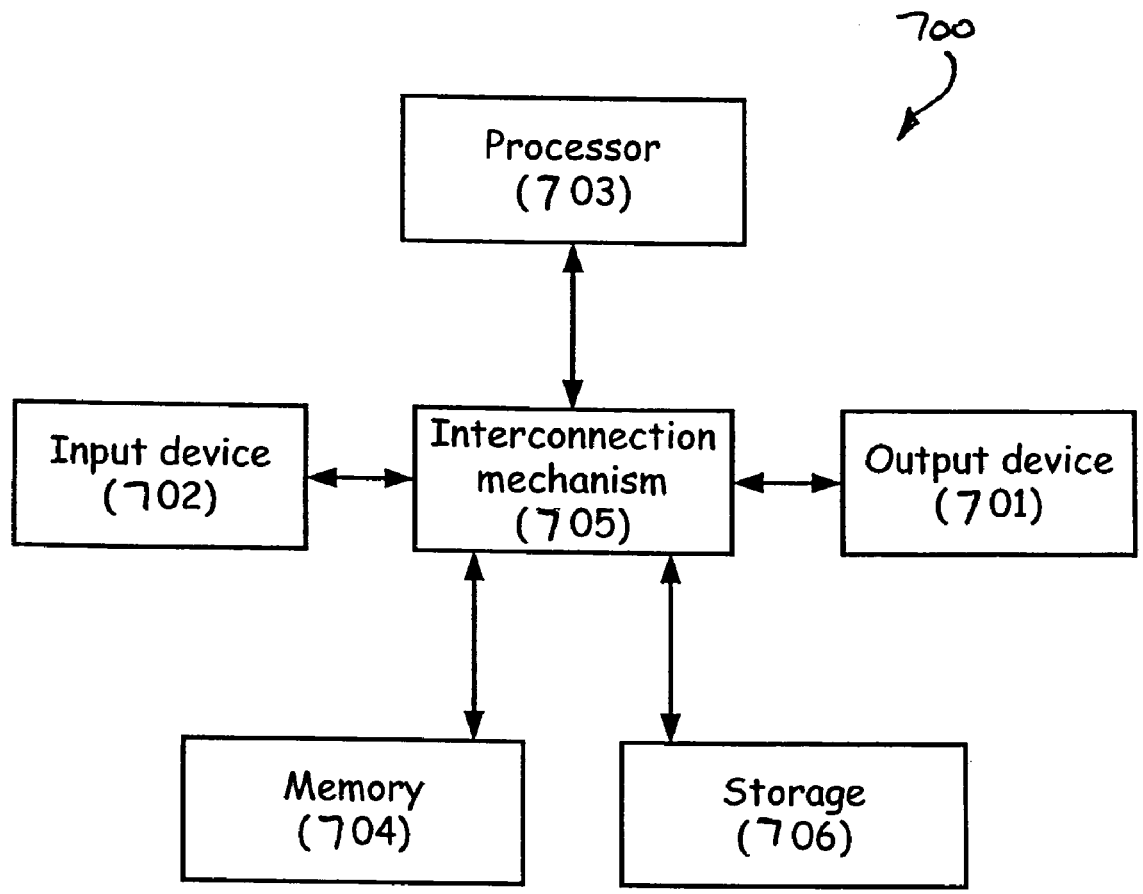
FIG. 7 is a block diagram of a computer system useful for embodying aspects of the invention.

For example, various aspects of the invention may be implemented as specialized software executing in a general-purpose computer system 700 such as that shown in FIG. 7. The computer system 700 may include a processor 703 connected to one or more memory devices 704, such as solid state memory, or other any other suitable device for storing data. Memory 704 is typically used for storing programs and data during operation of the computer system 700. Components of computer system 700 may be coupled by an interconnection mechanism 705, which may include one or more busses (e.g., between components that are integrated within a same machine) and/or a network (e.g., between components that reside on separate discrete machines). The interconnection mechanism 705 enables communications (e.g., data, instructions) to be exchanged between system components of system 700.

Computer system 700 also includes one or more input devices 702, for example, a keyboard, mouse, trackball, the microphone discussed above, touch screen, and one or more output devices 701, for example, a printing device, display screen, speaker. In addition, computer system 700 may contain one or more interfaces (not shown) that connect computer system 700 to a communication network (in addition or as an alternative to the interconnection mechanism 705.

Figure 8:
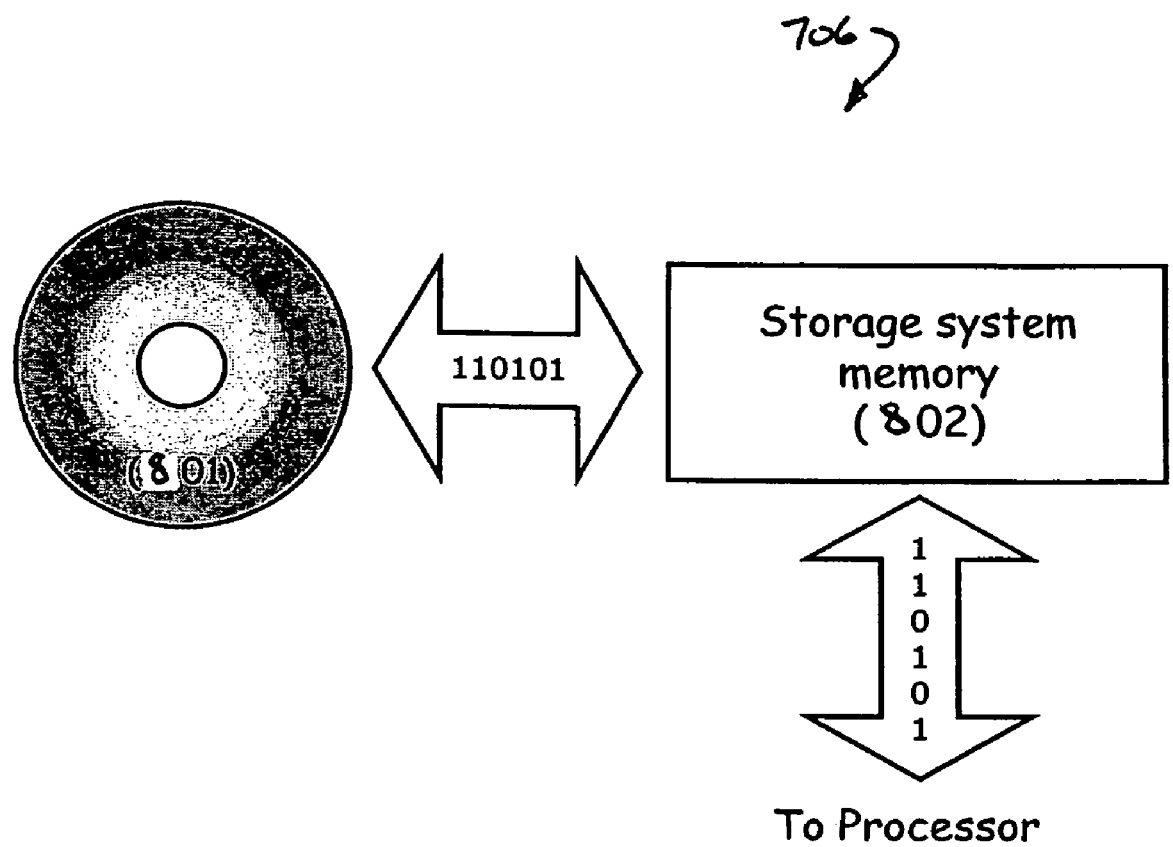
FIG. 8 is a block diagram of the storage subsystem of the computer system of FIG. 7.

The storage system 706, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a solid state dynamic random access memory (DRAM) or static memory (SRAM). It may be located in storage system 706, as shown, or in memory system 704. The processor 703 generally manipulates the data within the volatile memory 704, 802 and then copies the data to the medium 801 after processing is completed. A variety of mechanisms are known for managing data movement between the medium 801 and the integrated circuit memory element 704, 802, and the invention is not limited thereto. The invention is not limited to a particular memory system 704 or storage system 706.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the invention may be practiced, it should be appreciated that aspects of the invention are not limited to being implemented on the computer system as shown in FIG. 7. Various aspects of the invention may be practiced on one or more computers having a different architecture or components than that shown in FIG. 7.

Computer system 700 may be a general-purpose computer system that is programmable using a high-level computer programming language. Computer system 700 may be also implemented using specially programmed, special purpose hardware. In computer system 700, processor 703 can be a commercially available processor such as the well-known Pentium class processor available from the Intel Corporation. Many other processors are available, as mentioned above, for example the T1 C55xx or C54xx series DSPs. Such a processor may execute an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. In the cases of computers based on the Dragonball or ARM processors, the Palm OS operating system available from Palm Source or the Windows Mobile 2003 for Pocket PC operating system available from Microsoft Corporation. Many other operating systems may be used, such as Linux, or no operating system may be used.

The processor and operating system (or lack) together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol. Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Other considerations

Some embodiments may have a logging capability to store the time, location and species matched for later display, uploading, printing, saving, etc. Location can be entered by hand, by the knowledgeable birder, in some embodiments. Others can employ the Global Positioning System (GPS) satellite system or other location-finding mechanism to automatically log the location.

Some embodiments may use off-the-shelf hand-held computing devices and sound capture peripherals with custom software. Cost reduction is possible by creating an application specific embedded system powered by a commercially available DSP processor or a custom Application Specific Integrated Circuit (ASIC).

Training

Whether based upon an expert system, rules engine, neural network, or Hidden Markov Model, embodiments of aspects of the invention can include a learning capability. In the case of rules-based systems and expert systems, a skilled operator can indicate correct identification and/or characteristics to check, while collecting vocalizations in the field. New rules would then be generated and added to the rules base. In the case of a neural network or Hidden Markov Model, each identification tentatively made in the field can then be graded by a skilled operator to teach the neural network correct responses. During the grading process, new responses can also be introduced as new species are encountered. Rules based, neural network weights, or Hidden Markov Model parameters then developed can be downloaded by the manufacturer to improve a rules base or network weights preloaded on manufactured devices.

EXAMPLE IDENTIFICATIONS

There are several hundred species of bird native to any particular geographic region, each with unique vocalizations. For each specific bird, there are a handful of characteristics in the vocalization that can aide in identification. However, the specific characteristics helpful in identification will vary from species to species. Thus, each species may have specific rules for making a positive identification match with the candidate.

Figure 2:
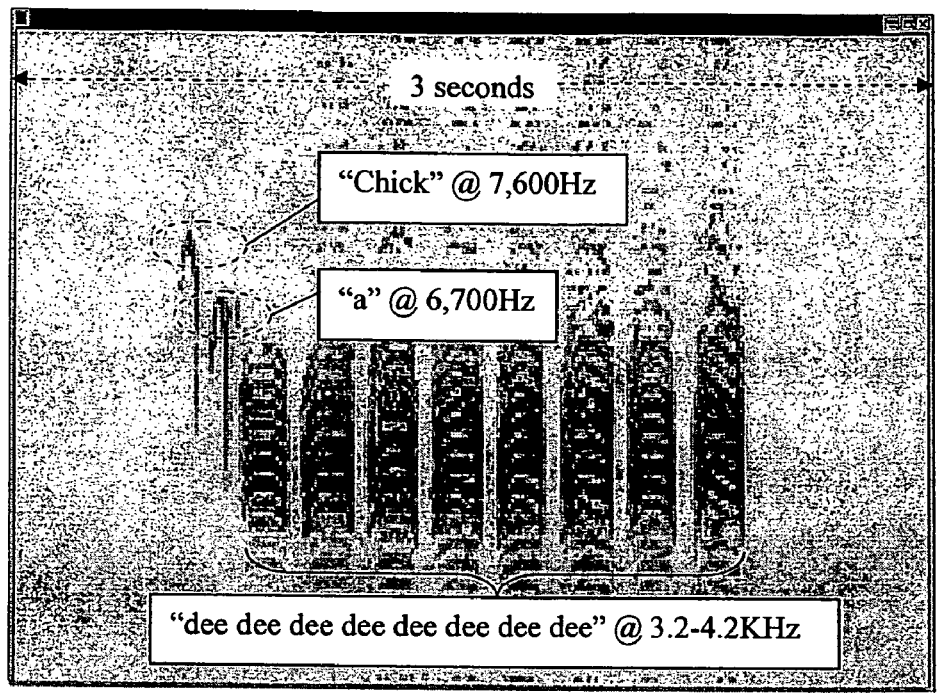
FIG. 2 is a representative spectrogram for a Black Capped Chickadee.

The identification of a Black Capped Chickadee, whose spectrogram is shown in FIG. 2, is now illustrated. Note that the Black Capped Chickadee is named for its unique vocalization which bird watchers would describe as sounding like "Chick-a-dee-dee-dee". In the spectrogram of a Black Capped Chickadee vocalization, the "Chick", "a", and "dee-dee-dee" sounds can be clearly seen as notes with specific frequencies, durations, and relationship with each other. There will be variations, of course, among individual birds and individual songs that they utter. They may vary somewhat in pitch, over time, and the number of "dee-dee" repetitions may vary as well. One possible rule for identifying a Black Capped Chickadee may be the following:

"A short note at approximately 7,600 Hz, followed immediately by a second short note at approximately 6,700 Hz, followed by a series of 2 or more notes with durations of approximately 0.20 seconds at approximately 3,800 Hz". A neural network comparing a sequence of samples from a candidate waveform to a known waveform for a Black Capped Chickadee inherently makes the comparison of this rule. Similarly, a Hidden Markov Model can describe the production of the observed sequence.

Figure 3:
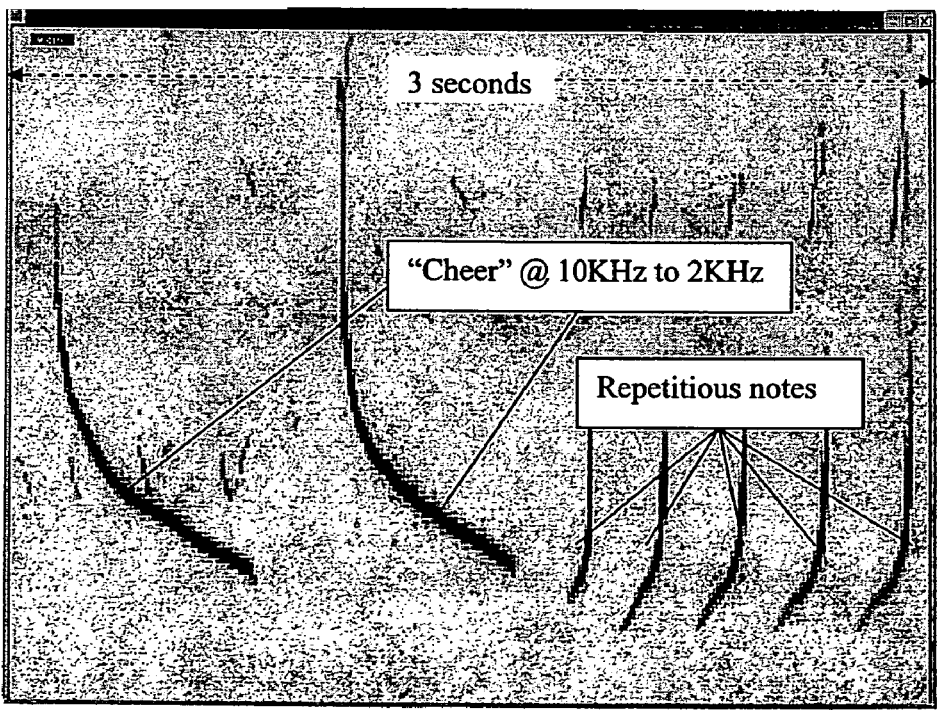
FIG. 3 is a representative spectrogram for a Cardinal.

Another distinctive bird vocalization is that of the Cardinal, an example spectrogram of which is shown in FIG. 3. The Cardinal vocalization as illustrated may be identified by a rule such as:

"One or two notes of about 700 ms each that each begin at about 10 kHz and slide continuously down to 2 kHz, followed by a series of about 2-5 repetitions of a 200 ms note rising from about 1 kHz to about 2 kHz."

Figure 4:
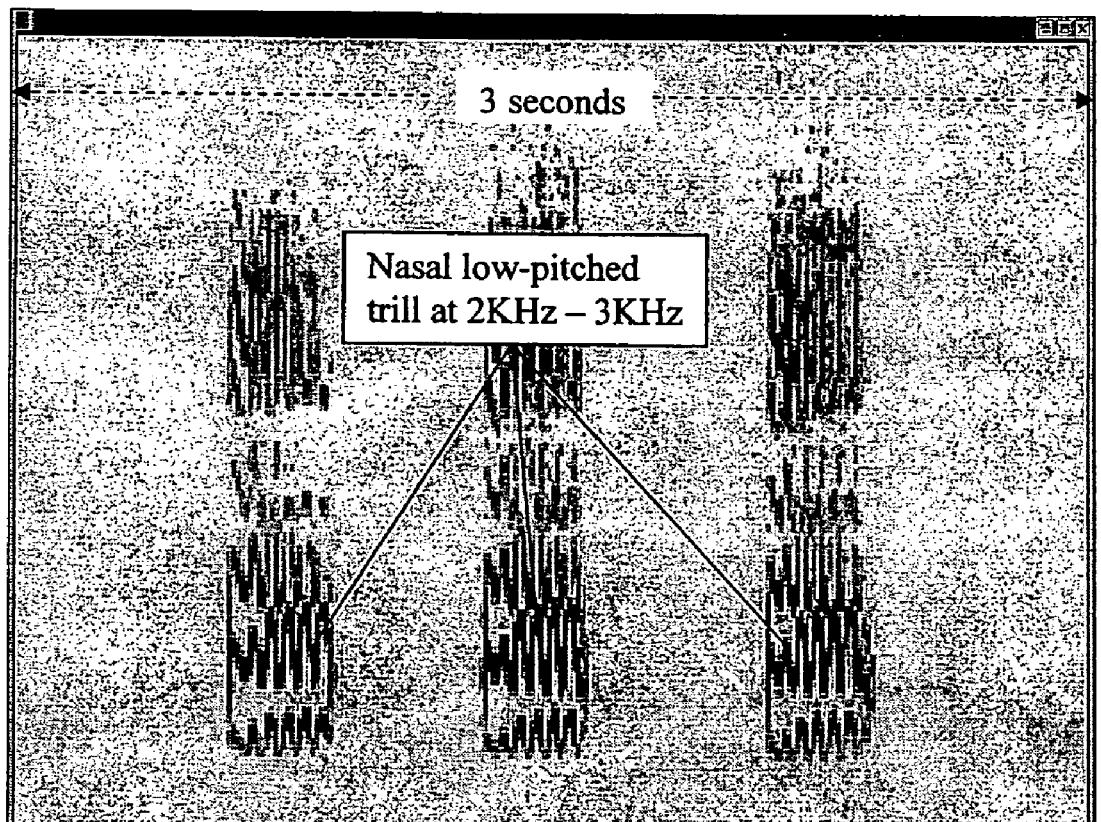
FIG. 4 is a representative spectrogram for a Red Bellied Woodpecker.

Yet another highly distinctive vocalization is that of a Red Bellied Woodpecker, an example spectrogram of which is shown in FIG. 4. A possible rule for identifying this bird may be:

"Three repetitions of a trilled note approximately 250 ms long and between 1 kHz and 2 kHz."

Figure 5:
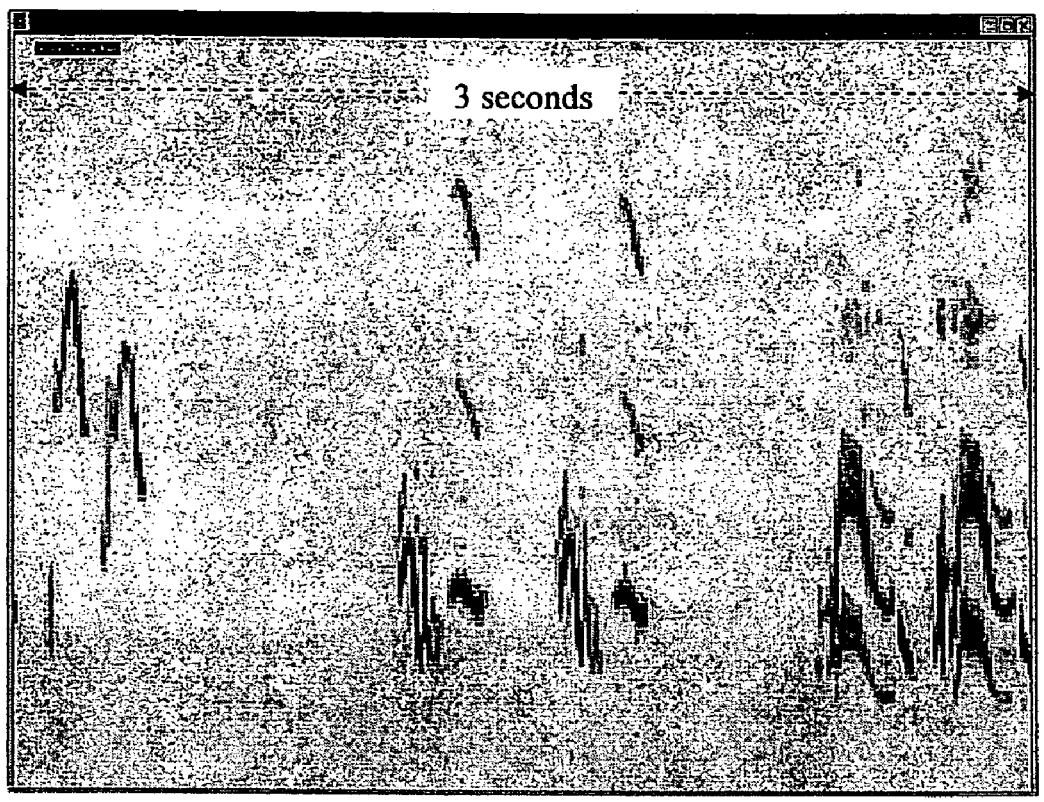
FIG. 5 is a representative spectrogram for a Brown Thrasher.

Identification of the Black Capped Chickadee, Cardinal and Red Bellied Woodpecker is fairly straightforward, as illustrated by the above rules. While many bird species are similarly easily identified by their specific repeating song patterns, other bird species have somewhat variable songs and need to be identified using different rules. For example, the Northern Mocking Bird has a song that typically incorporates notes at several different frequencies, but can be identified by the fact that these notes are relatively short in duration and are repeated several times in a row before changing. Similarly, the Brown Thrasher incorporates several different frequencies, but can be identified by the fact that these notes repeat twice in a row before changing. See FIG. 5.

Figure 6:
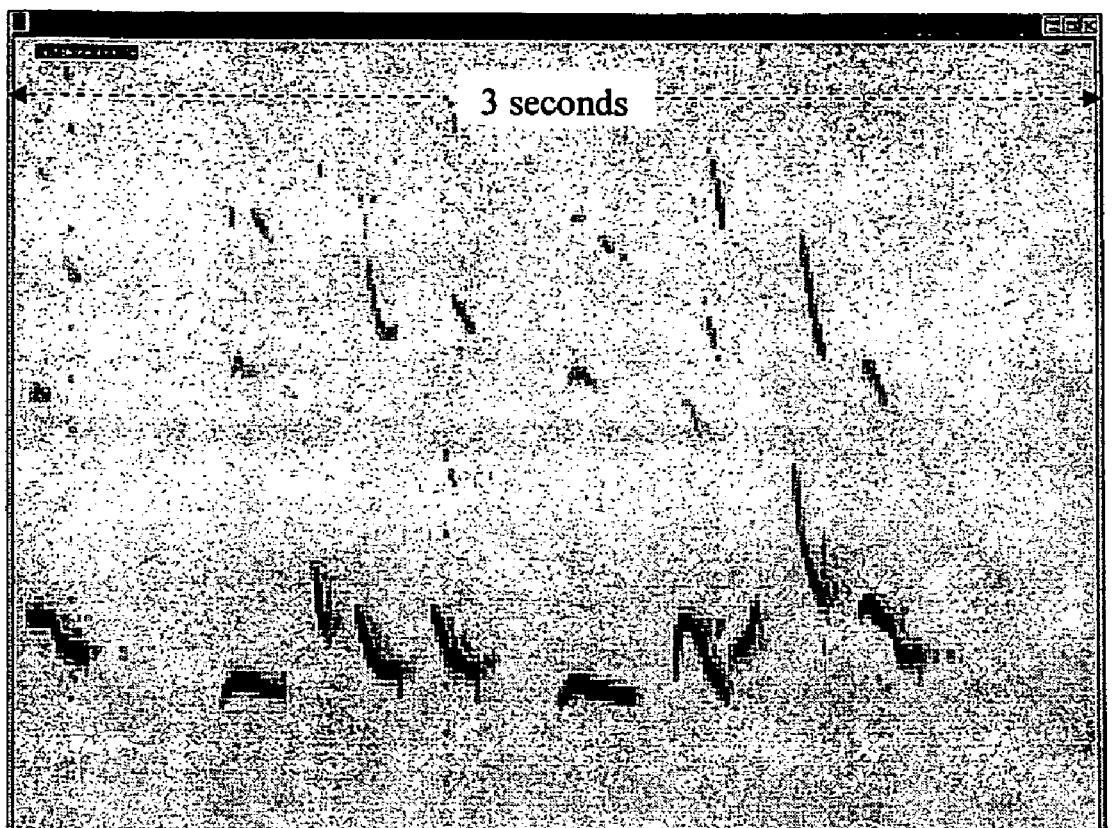
FIG. 6 is a representative spectrogram for a Baltimore Oriole.

In yet more complex example, the spectrogram of the Baltimore Oriole is shown in FIG. 6. The song of the Baltimore Oriole is quite variable within an individual bird's repertoire, and also from individual to individual. However, duration of notes, sustained areas of fixed frequencies, attack and decay rates, general frequency range and other waveform characteristics can distinguish this spectrogram from those of other birds.

PROTOTYPE EMBODIMENTS

Prototypes based on 1) HMMs, 2) neural networks, and 3) expert systems have been constructed. Concepts from each of these embodiments can be combined where suitable and desirable to optimize the performance of the combination. These and other prototypes based on other technologies have also been constructed. Prototypes based on HMMs are now described herein, while prototypes based on other technologies have been described in detail in related U.S. Patent Applications Ser. No. 60/498,507 (pending) and Ser. No. 10/767, 801 (pending).

Approaching Using HMMs to Match Phrases

A working prototype embodying aspects of the invention discussed above using HMMs to match phrases has been realized. In this prototype, the observations to be processed by the HMM, i.e. the features extracted from each bird call, are a time-series of spectral vectors. An observation sequence is a "phrase," defined as a series of "notes" occurring close together in time. A "note" is defined as a period of time during which the signal amplitude is sustained above some threshold delimited by lack of signal or signal below some threshold.

Skilled artisans in automated bird recognition have not recognized that "phrases" represent a unit of signal appropriate in solving the species classification problem. Common, is the use of sinusoids, or of waveform correlation, which is a primitive version of note classification.

It has been observed that bird vocalizations consist of small bursts of acoustic energy referred to as "notes". A tight grouping of "notes" forms a "phrase". Some birds have only one note, where groupings of the note into a phrase relates to the tempo and repetitiousness of the vocalization; other birds have a limited set of notes that are arranged into phrases in different ways; and still other birds have great variability in notes. Looking at individual notes fails to classify birds effectively in the second two cases. Looking at phrases, however, can very effectively classify birds in the first two cases. For the third case, HMMs perform well by looking at how notes are formed, even variably.

Bird vocalizations consist of notes organized into phrases. For the purpose of the prototype, a note is described as a series of contiguous signal frames preceded and followed by background frames. A phrase is described as a series of notes with no more than 24 contiguous background frames (0.384 s). Phrases longer than 372 frames are truncated to be less than or equal to 372 frames, where the last frame is selected to be the frame immediately preceding a background frame. Contiguous background frames are combined into a single observation vector to avoid misclassification by similar tempos emphasized over similar spectral properties and arrangements of notes.

Figure 9:
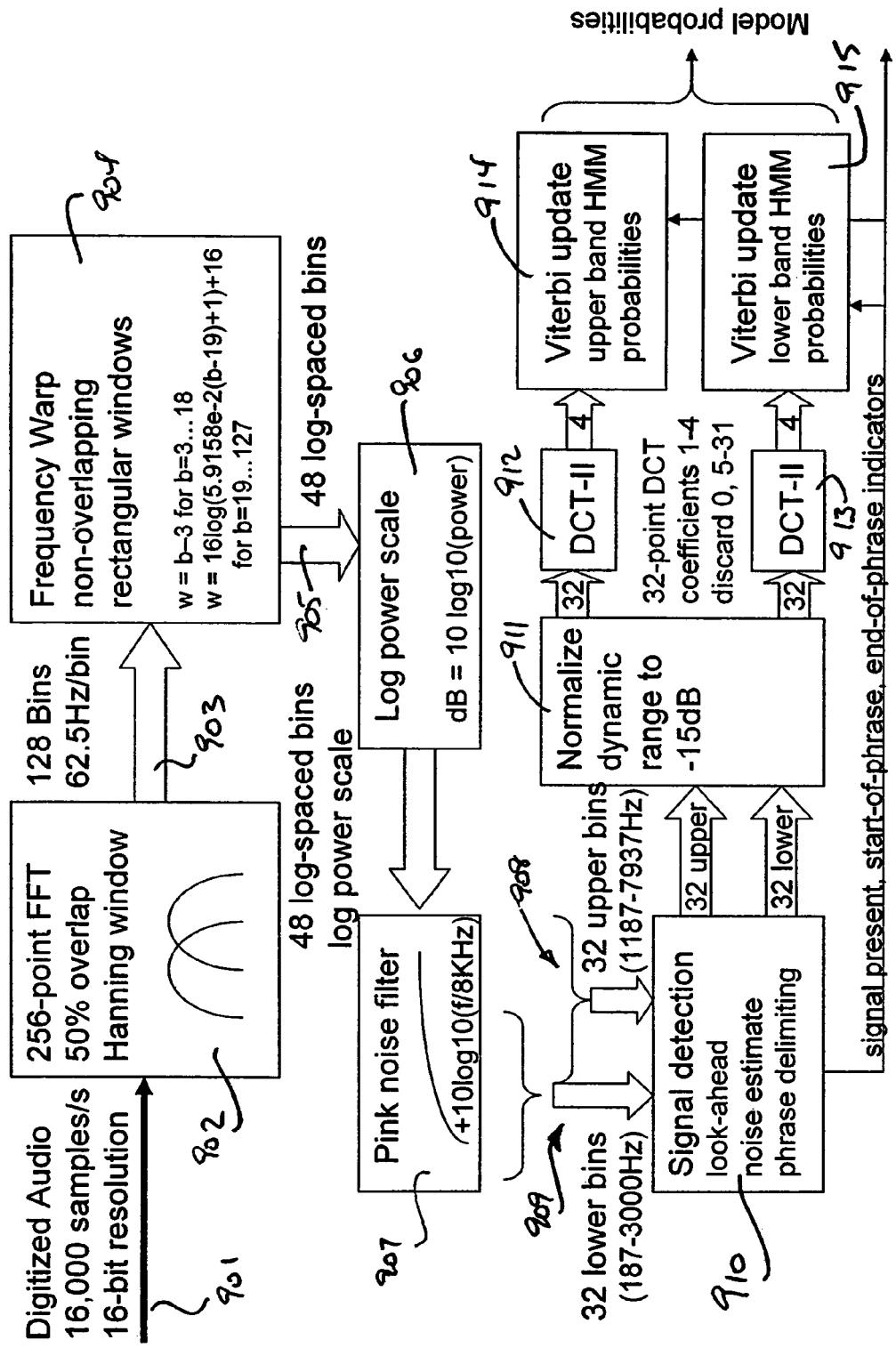
FIG. 9 is a block diagram showing the feature extraction and classification section of an embodiment of the invention.

FIG. 9 illustrates how feature vectors are extracted from the input signal. First, the input signal is digitized at a rate of 16,000 samples per second using 16-bits per sample, signal 901. Two 50%-overlapping 256-point FFTs using Hanning windows are averaged, step 902, phase information is discarded, resulting in a 0.016 second frame with power levels for 128 frequency bins between 0-8,000 Hz spaced 62.5 Hz apart, signal 903. The 128 linear-spaced frequency bins are compressed into 48 approximately log-spaced bins, signal 905, by averaging non-overlapping rectangular windows, step 904.

Step 904 is similar to calculating a Mel-scale filter bank using triangular windows as is common in speech recognition applications. However, triangular windows do not perform well for narrow-band vocalizations (such as bird whistles) because slight variances in pitch can result in large variances in the bin outputs, and because the Mel scale, designed around human auditory perception, is not well suited to high-frequency vocalizations found in many species of bird. Whereas Mel scale bins of frequency f in Hz is $M=127.010481 \log(1+f/700)$, the current embodiment uses the formula $M'=16 \log(1+(f-1187.15)/1056.5)$ for frequencies between 1187.5-8000 Hz, and $M'=f/62.5-3$ for frequencies between 187.5-1187.5 Hz The 48 log-spaced bins are converted from absolute power scale to a log power scale, step 906. A pink noise filter, step 907, is applied to the 48 bins by subtracting a constant vector from the bins such that lower frequencies are attenuated more than higher frequencies. The pink noise filtering step, 907, is done in the log power domain because attenuation of low frequencies in the linear power domain would result in small fractions which can not be conveniently represented in a fixed-point implementation.

The 48 bins are split into two overlapping 32-bin bands, one band, signal 908, for frequencies between 1,187.5-7,937.5 Hz, and the other, signal 909, for frequencies between 187.5-3,000 Hz. Most common birds have vocalizations in only the higher frequency band, while some birds such as owls and doves have vocalizations that fall in the lower band. Much of the noise encountered in the field from wind, airplanes, cars, water, etc., tend to fall in the lower bands. So, the frequency spectrum is split to offer better recognition performance for the majority of birds which fall in the higher frequency band, but still offer a mechanism to attempt recognition of birds which fall in the lower frequency band in lower noise environments. The power levels in each band is used to estimate background noise levels, and to determine if the frame should be classified as a signal frame (if some threshold above background), or a background frame (otherwise).

Signal detection, step 910, can be performed on both bands independently. A phrase begins with the first onset of signal, and ends at the first background frame following a signal frame when either 24 contiguous background frames are encountered, or when the maximum phrase length is reached. The dynamic range in each band is normalized, step 911, to −15 dB, meaning that the strongest bin power level is adjusted to 0 dB, and any bin falling below −15 dB is set to −15 dB.

A 32-point Discrete Cosine Transform (DCT-II), steps 912 and 913, is performed on each band to produce the first 4 DCT coefficients, excluding the D.C. component, which is discarded. The result is a pair of 4-dimensional vectors, one for each band. Each Hidden Markov Model analyzes the content of only one band, steps 914 and 915, and model probabilities are updated based on the corresponding observation vector. The observation sequence consists of a variable number of these vectors that comprise a phrase.

One difficult aspect of creating an effective HMM for recognition is developing an initial model. It is fairly common in speech recognition applications to take a word or phoneme to be recognized, divide the word or phoneme into fixed-length time slices, and assign each time slice to a state.

In bird vocalizations, the "words" or "phonemes" of a particular species of bird are not known. A bird phrase may contain many different notes, some of which may be repeated, and separated by a gap between notes. If a phrase was simply arbitrarily cut into frames, without paying attention to the delimiting gaps, then there would be states containing both gaps and signal. Further, it would be difficult to capture the repetition of notes within a phrase if different states were assigned arbitrarily to signal throughout the phrase.

It has been found that it is better to classify the notes within phrases across the training data so that notes that repeat can be recognized. Different instances of the same repeating note should be assigned to the same set of states. And gaps should also be assigned to states. In order to capture some of the bird's syntax of how notes are arranged, different gap states are assigned to the gaps following different notes.

For example, referring to a common Cardinal "cheer" vocalization as depicted in FIG. 3, there are two classes of notes: the long downslurred note (shown with two repetitions); followed by several shorter upslurred notes, comprising a phrase. A training set of many Cardinal "cheer" vocalizations may show some with different repetitions, variant in duration and pitch, but all characterized by roughly the same set of two notes.

Figure 10:
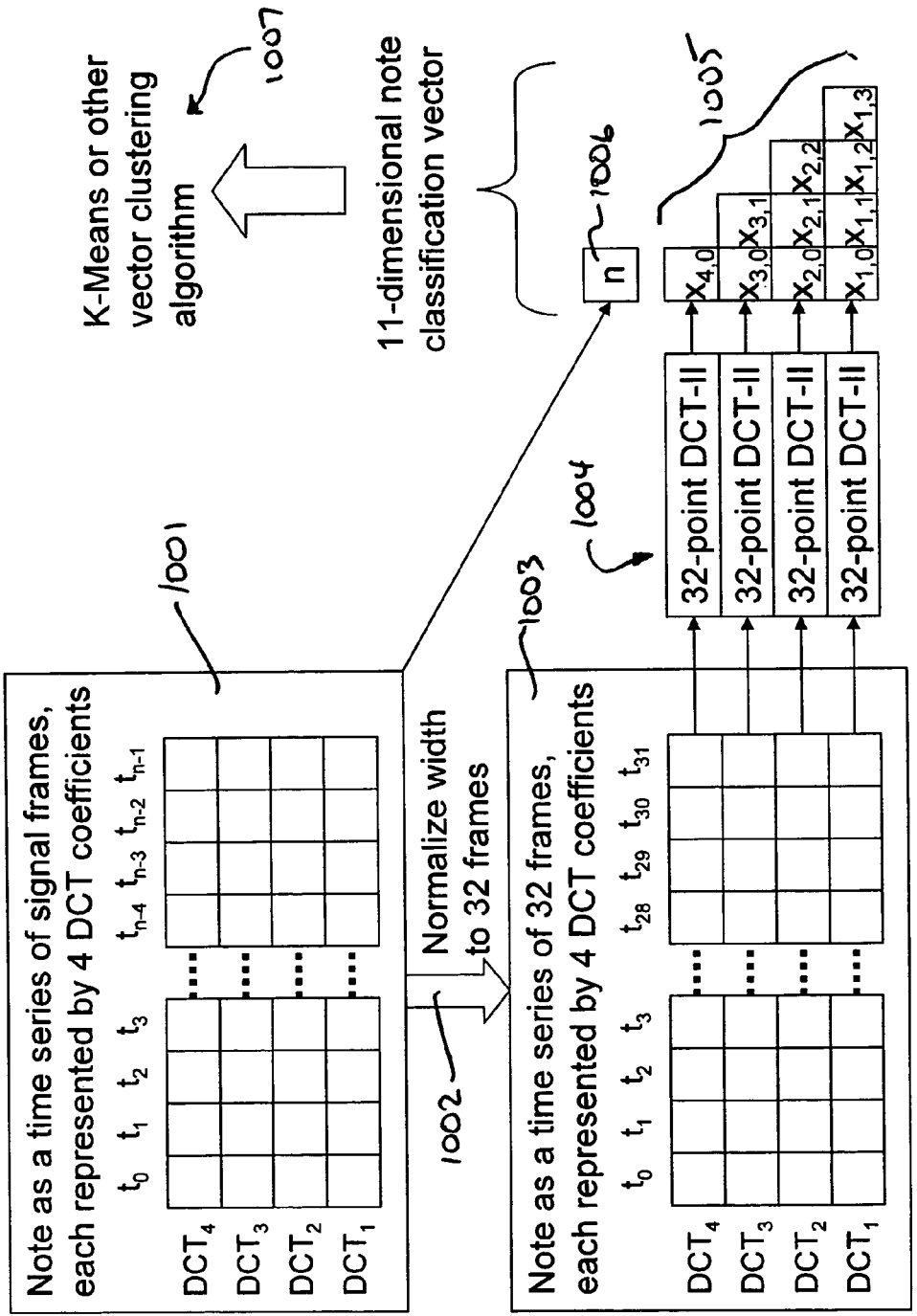
FIG. 10 is an illustration of the process of note classification performed by an embodiment of the invention.

FIG. 10 illustrates how notes are classified. Each note is represented as a variable-length time-series of n vectors of 4 DCT coefficients each, 1001. First, the n vectors are normalized to a 32-frame width, step 1002, to form a time series of 32 frames, 1003, each having 4 DCT coefficients. We choose 32 so that the same 32-point DCT code used to operate on the frequency bands as described above can be re-used here, although other size frames and DCTs can be used. Four 32-point DCTs are performed on the 32 normalized vectors for each dimension, steps 1004, producing 2-dimensional DCT coefficients, 1005. A total of ten of these coefficients are used as shown, 1005, together with the original duration of the note, 1006, to produce an 11-dimensional feature vector that describes the note. The notes are then clustered using K-Means, step 1007.

Figure 11:
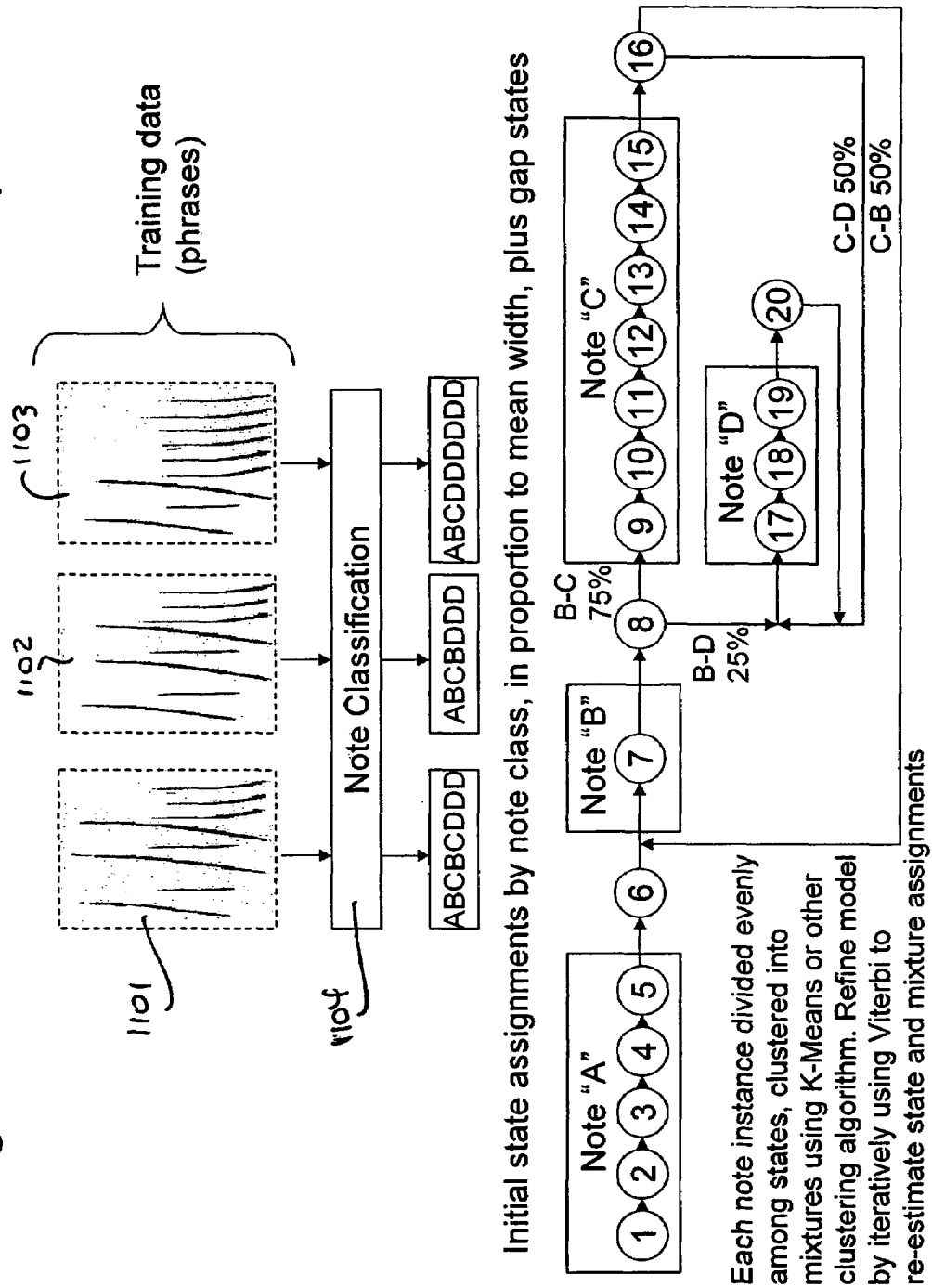
FIG. 11 is an illustration of the process performed by an embodiment of the invention for estimating the initial Hidden Markov Model structure and the initial Hidden Markov Model parameters.

FIG. 11 illustrates how the initial structure and parameters of a Hidden Markov Model can be estimated given a number of phrases of a known vocalization. FIG. 11 shows three different phrases, 1101, 1102 and 1103, containing a total of 25 distinct notes common to the up slurred "wheet" vocalization of the Northern Cardinal. Each phrase begins with a medium size up slurred note (of which there are 3), followed by a short down slurred note (of which there are 5). Also notice the presence of larger up slurred notes (of which there are 5), and ending with larger down slurred notes (of which there are 12). The 25 notes are classified, step 1104, as described above into 4 classes denoted "A," "B." "C" and "D," as shown. The first two phrases have an identical structure of "ABCBCDDD", while the third phrase is slightly different "ABCDDDDDD" as shown, where "A" corresponds to the initial medium size up slurred note, "B" corresponds to the short down slurred note, "C" corresponds to the larger up slurred note, and "D" corresponds to the larger down slurred note.

States are assigned to each note class in proportion to the mean duration of notes in the class. The prototype attempts to assign at least 3 frames to each state, but is also limited by a maximum of 32 states per model, so may increase the frames per state in order to fit the observed classes into the model. In this example, we assign 5 states to note "A", 1 state to note "B", 7 states to note "C", and 3 states to note "D". Additionally, we assign four more states, each representing the gap following each of the four note classes, for a total of 20 states as shown. Each observation vector is then assigned to a state. For example, for each occurrence of an "A" class note, the note's frames would be divided evenly into 5 states, with the first ⅕ assigned to state 1, the second ⅕ assigned to state 2, and so on. The vectors corresponding to the background frames following the class "A" notes would be assigned to state 6 as shown.

All the observation vectors for each state are further clustered using K-Means into up to two mixtures per state, and the mean vector for each mixture is calculated. State transition probabilities can be estimated by counting the number of transitions from one state to the next. For example, there are three instances in which a "B" class note is followed by a "C" class note, but only one instance in which a "B" class note is followed by a "D" class note. Thus, the probability of transitioning from state 8 to state 9 is 75% while the probability of transitioning from state 8 to state 17 is 25%.

Finally, the Viterbi algorithm is performed for each observation sequence on the estimated model to calculate the probability that each phrase matches the model, and these per-phrase probabilities are combined into a score for the model. The model and score are saved, and backtracking is used to determine the likely state sequence and mixture selected for each frame.

The model parameters are updated based on these new state and mixture assignments and Viterbi is performed yet again, iteratively, until no more improvement in the model can be made. This last step refines the initial estimate of the model. Another optimization is the number of note classes. The training algorithm can repeat the entire procedure described above using different values for the number of note classes until the best number of classes for the model is found. Thus, fairly good models can be generated automatically with little human intervention. That being said, many parameters can be overridden such as the number of classes, the number of mixtures per state, the number of frames per state, the minimum probability of any transition, and so on, the value of the fixed co-variance matrix, and so on.

The prototype is described below.

The database of known bird vocalizations comprises parameters for a set of Hidden Markov Models in which there are one or more Hidden Markov Models for each vocalization. Some birds may have many vocalizations, and each vocalization may have more than one variation (e.g. typical regional or individual variations), each represented by a different Hidden Markov Model. Also, rather than discrete symbols, the prototype makes use of continuous Gaussian probability densities with multiple mixtures per state. Alternative implementations may use some form of vector quantization such as Linde-Buzo-Grey or K-Means to convert the DCT coefficients into a set of discrete symbols.

When using Gaussian mixtures, it is common to define a mean vector and a co-variance matrix to describe a multivariate Gaussian distribution. When there is a large amount of training data, good values for the mean and co-variance matrix can be calculated. However, when there is insufficient training data, the calculation of variance can easily be too large or too small. When used in HMMs, an incorrectly large variance value will artificially increase the probability that a given observation occurs in a state resulting in false positives, while an incorrectly small variance value will artificially decrease the probability that a given observation occurs in a state resulting in false negatives. Since only a limited number of bird song recordings are readily available, compared to the large variety among individuals within a species, there is often insufficient training data available for reliable calculation of co-variance matrices.

Instead, this exemplary embodiment uses a fixed value for the co-variance matrix optimized for maximum recognition performance across the set of HMMs. A beneficial side effect is that there is no need to store co-variance matrices among the HMM parameters thus reducing the size of the database. Yet another benefit is that Gaussian HMMs are known to suffer from a fixed ratio of spectral emphasis to temporal emphasis. By increasing the variance, the effective emphasis of spectral characteristics is lowered while that of temporal characteristics is increased, and vice versa. It has been found that tuning the value of the Variance can result in maximum recognition performance by increasing the distance between models.

Through experimentation, a fixed variance of $0.016 \text{ dB}^2$ for each dimension was found to be effective. Finally, note that minimum state transition probabilities, initial state probabilities, and mixture coefficients of 0.002 are used to improve the matching of variations and noisy samples.

A prototype was constructed consisting of 101 vocalizations from 60 distinct species. Training data included between 10 and 30 seconds of high quality digitized recordings. After training the 101 Hidden Markov Models, the training data was used to test recognition performance. Out of 1,415 distinct phrases, 1,389 were classified correctly, or 98.16%. Field testing was also performed in a variety of environments, and several real-world species of birds were recognized successfully.

Combinations

There may be bird songs that are particularly difficult to identify, even using the technique describe above. Because different approaches, including those described in the identified related U.S. patent application, each have their own strengths, they may be advantageously combined to identify a broad range of bird songs. For example, a neural network can be combined with a rules-based expert systems approach to advantageously identify differently characterized bird songs, as discussed above.

The present invention has been described relative to an illustrative embodiment. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. Apparatus for identifying animal species from their vocalizations, comprising:
a source of digital signals representative of at least one animal candidate vocalization;
a transformer connected to receive the digital signals and which produces a first digital transformation corresponding to a first digital signal and a second digital transformation corresponding to a second digital signal;
a feature extractor that receives and analyzes the first digital transformation, recognizes notes therein, the notes being periods of time during which the first digital signal has an amplitude sufficient to exceed a minimum threshold, and extracts phrases including plural notes and that produces a parametric representation of the extracted phrases; and
a comparison engine that receives the second digital transformation and compares the second digital transformation against the parametric representation of the extracted phrases, and produces an output signal representing information about the animal candidate based on a likely match between the animal candidate vocalization and known animal vocalizations.

2. The apparatus as claimed in claim 1, wherein the first and second digital transformations are each a digital spectrogram representing power and frequency of the respective digital signal at each point in time.

3. The apparatus as claimed in claim 2, wherein the transformer comprises:
a Discrete Fourier Transformer (DFT) having as an output signal a time series of frames comprising the digital spectrogram, each frame representing power and frequency data at a point in time.

4. The apparatus as claimed in claim 2, wherein the power is represented by a signal having a logarithmic scale.

5. The apparatus as claimed in claim 2, wherein the frequency is represented by a signal having a logarithmic scale.

6. The apparatus as claimed in claim 2, wherein the power is represented by a signal that has been normalized relative to a reference power scale.

7. The apparatus as claimed in claim 2, wherein the frequency is represented by a signal that has been normalized relative to a reference frequency scale.

8. The apparatus as claimed in claim 1, wherein the transformer comprises a discrete cosine transform (DCT) transformer receiving the first digital signal and producing a signal representing plural coefficients defining the parametric representation of the extracted phrases.

9. The apparatus as claimed in claim 1, wherein the transformer produces a signal defining a parametric representation of each note.

10. The apparatus as claimed in claim 9, wherein the transformer is a discrete cosine transform (DCT) transformer.

11. The apparatus as claimed in claim 9, wherein the feature extractor further comprises:
a time normalizer operative upon each note recognized in the first digital signal before the transformer receives the first digital signal.

12. The apparatus as claimed in claim 9, wherein the comparison engine further comprises:
a cluster recognizer that groups notes into clusters according to similar parametric representations.

13. The apparatus as claimed in claim 12, wherein the cluster recognizer performs K-Means processing.

14. The apparatus as claimed in claim 12, wherein the cluster recognizer is a self-organizing map (SOM).

15. The apparatus as claimed in claim 12, wherein the cluster recognizer performs Linde-Buzo-Gray processing.

16. The apparatus as claimed in claim 1, wherein the comparison engine further comprises:
a neural network trained to recognize likely matches between the animal candidate vocalization and the known animal vocalizations.

17. The apparatus as claimed in claim 16, wherein the neural network further comprises:
plural layers of processing elements arranged between an input of the comparison engine and an output of the comparison engine, including a Kohonen self-organizing map (SOM) layer.

18. The apparatus as claimed in claim 16, wherein the neural network further comprises:
plural layers of processing elements arranged between an input of the comparison engine and an output of the comparison engine, including a Grossberg layer.

19. The apparatus as claimed in claim 1, wherein the comparison engine further comprises:
a set of hidden Markov models (HMMs) excited by the parametric representation received, each HMM defined by a plurality of states.

20. The apparatus as claimed in claim 19, wherein at least one of the plurality of states comprises:
a data structure holding values defining a probability density function defining the likelihood of producing an observation.

21. The apparatus as claimed in claim 20, wherein the probability density function is a multi-variate Gaussian mixture.

22. The apparatus as claimed in claim 21, wherein the multi-variate Gaussian mixture is defined by a fixed co-variance matrix.

23. The apparatus as claimed in claim 19, wherein an HMM of the set of HMMs produces an observation corresponding to a bird species.

24. The apparatus as claimed in claim 19, wherein an HMM corresponding to a set of training data representing at least one vocalization comprises:
a first set of states representing a first cluster of time-normalized notes, classified according to similar parametric representations; and
a second set of states representing a second cluster of time-normalized notes, classified according to similar parametric representations different from those of the first cluster of time-normalized notes.

25. The apparatus as claimed in claim 24, wherein the HMM further comprises: a state corresponding to a gap between a note of the first cluster and a note of the second cluster.

26. The apparatus as claimed in claim 24, wherein the set of training data includes coefficients from a discrete cosine transform (DCT) performed on a vocalization signal.

27. The apparatus as claimed in claim 24, wherein the first cluster comprises classification vectors clustered together using a K-Means process.

28. The apparatus as claimed in claim 24, wherein the first cluster comprises classification vectors clustered together using a self-organizing map (SOM).

29. The apparatus as claimed in claim 24, wherein the first cluster comprises classification vectors clustered together using a Linde-Buzo-Gray process.

30. The apparatus as claimed in claim 1, further comprising a database of known bird songs.

31. The apparatus as claimed in claim 30, wherein the database comprises:
a data structure holding values in a memory of weights for a neural network.

32. The apparatus as claimed in claim 30, wherein the database comprises:
a data structure holding values in a memory of parameters for a hidden Markov model (HMM).

33. The apparatus as claimed in claim 30, wherein the database comprises:
a data structure holding records in a memory corresponding to the known bird songs specific to at least one of a region, a habitat, and a season.

34. The apparatus as claimed in claim 30, wherein the database of known bird songs is stored in a replaceable memory, such that the database of known bird songs can be modified by replacing the replaceable memory with a replaceable memory holding the modified database.

35. The apparatus as claimed in claim 30, wherein the database of known bird songs is stored in a modifiable memory.

36. The apparatus as claimed in claim 35, wherein the apparatus includes a port through which modifications to the database of known bird songs can be uploaded.

37. The apparatus as claimed in claim 36, wherein the port is wireless.

38. The apparatus as claimed in claim 30, the database further comprising a known recording of at least one bird vocalization, playable to help an operator confirm a match.

39. The apparatus as claimed in claim 30, wherein the database holds time sequences of DFT coefficients.

40. The apparatus as claimed in claim 30, wherein the database holds time sequences of DCT coefficients.

41. The apparatus as claimed in claim 30, wherein the database holds the LPC coefficients.

42. The apparatus as claimed in claim 30, wherein the database holds cepstrum coefficients.

43. The apparatus as claimed in claim 30, wherein the database holds images of spectrograms.

44. The apparatus as claimed in claim 30, wherein the database holds input waveforms.

45. The apparatus as claimed in claim 1, further comprising:
a digital filter interposed between the source of a digital signal and the feature extractor.

46. The apparatus as claimed in claim 1, wherein the source further comprises: a microphone.

47. The apparatus as claimed in claim 46, wherein the source further comprises:
an analog-to-digital converter connected to receive an analog signal from the microphone and to produce the digital signals.

48. The apparatus as claimed in claim 46, wherein the microphone further comprises:
a shotgun microphone.

49. The apparatus as claimed in claim 46, wherein the microphone further comprises:
a parabolic microphone.

50. The apparatus as claimed in claim 46, wherein the microphone further comprises:
an omnidirectional microphone.

51. The apparatus as claimed in claim 46, wherein the microphone further comprises:
an array of microphones.

52. The apparatus as claimed in claim 51, wherein the array of microphones is made directional by use of beam-forming techniques.

53. The apparatus as claimed in claim 1, wherein the source further comprises:
an analog signal input; and
an analog-to-digital converter connected to receive a signal from the analog input, and producing the digital input signal.

54. The apparatus as claimed in claim 1, wherein a time from the transformer receiving the digital signal to the comparison engine producing the output signal is real-time.

55. The apparatus as claimed in claim 1, wherein the feature extractor comprises:
means for characterizing notes as combinations of frames of digitized signal; and
means for characterizing phrases as combinations of notes.

56. The apparatus as claimed in claim 1, wherein the feature extractor comprises:
a linear predictive coder (LPC) which extracts spectral features from the first digital transformation.

57. The apparatus as claimed in claim 1, wherein the feature extractor comprises:
a real and/or complex cepstrum coefficient extractor which extracts spectral features from the first digital transformation.

58. The apparatus as claimed in claim 1, configured for automatic training, further comprising:
means for parameterizing notes in the training data using a set of time normalized 2-dimensional DCT coefficients; and
means for classifying parameterized notes using K-means.

59. The apparatus as claimed in claim 1, wherein the transformer comprises:
a series of parallel, band-pass filters including one filter for each band of frequencies of interest.

60. The apparatus as claimed in claim 59, wherein one of the band-pass filters comprises:
a finite impulse response (FIR) filter.

61. The apparatus as claimed in claim 59, wherein one of the band-pass filters comprises:
an infinite impulse response (IIR) filter.

62. The apparatus as claimed in claim 1, wherein the transformer comprises:
a wavelet transformer.

63. The apparatus as claimed in claim 62, wherein the wavelet transformer comprises:
a continuous wavelet transform (CWT).

64. The apparatus as claimed in claim 62, wherein the wavelet transformer comprises:
a discrete wavelet transform (DWT).

65. The apparatus as claimed in claim 1, further comprising:
an input filter prior to the feature extractor.

66. The apparatus as claimed in claim 65, wherein the input filter further comprises:
a predetermined profile selected to de-emphasize a known noise profile.

67. The apparatus as claimed in claim 66, wherein the input filter further comprises:
a pink noise filter.

68. The apparatus as claimed in claim 1, further comprising:
a probabilistic matching engine having an output signal representing an aggregation of probable matches for the digital signal over a short period of time.

69. The apparatus as claimed in claim 1, wherein the parametric representation of the extracted phrases includes a syntactic representation of the plural notes making up each extracted phrase.

70. A computer-implemented method of identifying animal species, comprising:
obtaining a digital signal representing a vocalization by a candidate animal;
transforming the digital signal into a parametric representation thereof;
extracting from the parametric representation a sequence of notes defining a phrase, each note being a period of time during which the digital signal has an amplitude sufficient to exceed a minimum threshold;
comparing the phrase to phrases known to be produced by a plurality of possible animal species; and
identifying a most likely match for the vocalization by the candidate animal based upon the comparison.

71. The method of claim 70, wherein comparing further comprises:
applying a portion of the parametric representation defining the phrase to plural Hidden Markov Models defining phrases known to be produced by a plurality of possible animal species; and
computing a probability that one of the plurality of possible animal species produced the vocalization by the candidate animal.

72. The method of claim 70, wherein transforming further comprises: performing two, overlapped Fourier transformers (FFTs) from which phase information is discarded to produce plural, linear-spaced frequency bins holding linear power levels comprising the plural, linear-spaced frequency bins into fewer, logarithmically-spaced frequency bins.

73. The method of claim 72, wherein transforming further comprising: converting the linear power levels to logarithmic power levels.

74. The method of claim 73, wherein the digitized signal includes about 16,000 samples per second.

75. The method of claim 73, further comprising:
filtering the converted power levels using a pink noise filter by subtracting a constant vector from the bins.

76. The method of claim 75, further comprising:
dividing the bins into two overlapping ranges, whereby better recognition without noise interference of signals in an upper one of the two bands is achieved, while also providing a capability of recognizing signals in a lower one of the two bands.

77. The method of claim 76, further comprising:
normalizing power levels to a highest measured power level, with a cut-off level below a predetermined threshold; and
detecting a phrase beginning with onset of signal above cut-off and ending with a first frame of signal below the cut-off for more than a predetermined time span.

78. The method of claim 77, further comprising:
performing a discrete cosine transform (DCT) on each one of the two overlapping ranges to produce an upper vector of DCT coefficients and a lower vector of DCT coefficients; and
separately analyzing using an HMM corresponding to an upper band vocalization the upper vector and using an HMM corresponding to a lower band vocalization the lower vector.

79. The method of claim 78, further comprising:
continuing to analyze a sequence of upper vectors and a sequence of lower vectors until an observation sequence forming a phrase is completed.

80. The method of claim 79, further comprising:
normalizing a plurality of vectors representing a note having a duration into a predetermined number of vectors;
performing a multipoint, two-dimensional DCT on the vectors to produce a predetermined number of coefficients;
combining the coefficients and the duration to form a feature vector; and
classifying the feature vector using K-means.

81. The method of claim 80, further comprising:
assigning states to notes, with notes having longer duration being assigned more states.

82. The method of claim 81, further comprising:
clustering notes using K-means.

83. The method of claim 82, further comprising:
estimating state transition probabilities on a basis of numbers of transitions from one state to another state.

84. The method of claim 83, further comprising:
evaluating a probability that the observation sequence matches the model by using the Viterbi algorithm; and
accumulating probabilities of several phrases over a period of time to produce an overall score.

85. Apparatus for identifying animal species from their vocalizations, comprising:
a source of digital signals representative of at least one animal candidate vocalization and at least one known animal vocalization;
a transformer connected to receive the digital signals and which produces a first digital transformation corresponding to a first digital signal representative of the known animal vocalization and a second digital transformation corresponding to a second digital signal representative of the animal candidate vocalization;
a feature extractor that receives and analyzes the first digital transformation, recognizes notes therein, the notes being periods of time during which the first digital signal has an amplitude sufficient to exceed a minimum threshold, and extracts from the first digital transformation phrases including plural notes, and that builds a parametric animal vocalization model based on a parametric representation of the extracted phrases; and
a comparison engine that receives the second digital transformation and applies the second digital transformation to the parametric animal vocalization model to produce an output signal representing information about an animal candidate based on a likely match between the animal candidate vocalization and known animal vocalizations.

86. The apparatus as claimed in claim 85, wherein the parametric representation of the extracted phrases includes a syntactic representation of the plural notes making up each extracted phrase.

87. The apparatus as claimed in claim 86, wherein the parametric animal vocalization model includes a set of hidden Markov models (HMMs), each HMM defined by a plurality of states; and
wherein the comparison engine excites the set of HMMs with the second digital transformation to produce the output signal.

88. The apparatus as claimed in claim 87, wherein each state comprises a data structure holding values defining a probability density function defining the likelihood of producing an observation.

89. The apparatus as claimed in claim 86, wherein the model comprises a neural network trained based on the parametric representation of the extracted phrases to recognize likely matches between the animal candidate vocalization and the known animal vocalizations.

90. The apparatus as claimed in claim 89, wherein the neural network further comprises:

plural layers of processing elements arranged between an input of the comparison engine and an output of the comparison engine, including a Kohonen self-organizing map (SOM) layer.

91. The apparatus as claimed in claim 89, wherein the neural network further comprises:

plural layers of processing elements arranged between an input of the comparison engine and an output of the comparison engine, including a Grossberg layer.

92. A computer-implemented method of identifying animal species, comprising:

obtaining a first digital signal representing a vocalization by known animal;

transforming the first digital signal into a parametric representation thereof;

extracting from the parametric representation a sequence of notes defining a phrase, each note being a period of time during which the first digital signal has an amplitude sufficient to exceed a minimum threshold;

building a probabilistic animal vocalization model based on the extracted sequence of notes;

obtaining a second digital signal representing a vocalization by a candidate animal;

transforming the second digital signal to produce a transformed digital signal;

applying the transformed digital signal to the probabilistic animal vocalization model to produce an output signal; and identifying a most likely match for the vocalization by the candidate animal based upon the output signal.

93. The method of claim 92, wherein applying the transformed digital signal to the probabilistic animal vocalization model includes applying the transformed digital signal to plural Hidden Markov Models defining phrases known to be produced by a plurality of possible animal species; and computing a probability that one of the plurality of possible animal species produced the vocalization by the candidate animal.

* * * * *

UNITED STATES PATENT AND TRADEMARK OFFICE
CERTIFICATE OF CORRECTION

PATENT NO. : 7,454,334 B2
APPLICATION NO. : 10/903658
DATED : November 18, 2008
INVENTOR(S) : Ian Agranat It is certified that error appears in the above-identified patent and that said Letters Patent is hereby corrected as shown below:

In column 2, line 24, "McIlraith" should be changed to -- McIlraith --.

In column 17, line 44, "M = 127.010481" should be changed to -- M = 1127.01048 --.

Signed and Sealed this

Seventeenth Day of March, 2009

JOHN DOLL
*Acting Director of the United States Patent and Trademark Office*